US007257581B1

(12) United States Patent
Steele et al.

(10) Patent No.: US 7,257,581 B1
(45) Date of Patent: Aug. 14, 2007

(54) STORAGE, MANAGEMENT AND DISTRIBUTION OF CONSUMER INFORMATION

(75) Inventors: Nick Steele, Powder Springs, GA (US); Stan Hawkins, Snellville, GA (US); Joe Maranville, Roswell, GA (US); Andrew Bradnan, Seattle, WA (US)

(73) Assignee: Guardian Networks, LLC, Kennesaw, GA (US)

( * ) Notice: Subject to any disclaimer, the term of this patent is extended or adjusted under 35 U.S.C. 154(b) by 665 days.

(21) Appl. No.: 09/923,285

(22) Filed: Aug. 6, 2001

Related U.S. Application Data

(60) Provisional application No. 60/223,232, filed on Aug. 4, 2000, provisional application No. 60/226,117, filed on Aug. 18, 2000, provisional application No. 60/238,847, filed on Oct. 6, 2000, provisional application No. 60/245,867, filed on Nov. 7, 2000, provisional application No. 60/253,298, filed on Nov. 27, 2000.

(51) Int. Cl.
*G06F 17/30* (2006.01)

(52) U.S. Cl. .............................. 707/10; 707/9; 709/203; 705/1

(58) Field of Classification Search .................. 707/10, 707/9; 705/1, 50, 76, 10, 9; 709/203, 201; 715/507, 508, 503
See application file for complete search history.

(56) References Cited

U.S. PATENT DOCUMENTS

| | | | |
|---|---|---|---|
| 5,644,723 A | 7/1997 | Deaton et al. | |
| 5,677,955 A * | 10/1997 | Doggett et al. | ............... 705/76 |
| 5,737,701 A | 4/1998 | Rosenthal et al. | |
| 5,774,551 A | 6/1998 | Wu et al. | |
| 5,794,259 A | 8/1998 | Kikinis | ........................ 707/507 |
| 5,815,665 A | 9/1998 | Teper et al. | ............ 395/200.59 |
| 5,855,007 A | 12/1998 | Jovicic et al. | |
| 5,872,850 A | 2/1999 | Klein et al. | .................... 380/49 |
| 5,911,141 A | 6/1999 | Kelley et al. | .................. 707/10 |

(Continued)

FOREIGN PATENT DOCUMENTS

WO     WO 01/46783     6/2001

OTHER PUBLICATIONS

Microsoft.NET Passport Technical Overview, Sep. 2001, entire article.

(Continued)

*Primary Examiner*—Greta Robinson
(74) *Attorney, Agent, or Firm*—King & Spalding LLP

(57) ABSTRACT

Consumers may centrally store, manage and distribute information using an information account stored in a central data repository. The information account is accessible from any client device, without the need to permanently store or install proprietary software thereon. The information account comprises a plurality of consumer information elements stored in a tagged data format. A host server hosts a database management system for accessing the information account. A client-side application may manage communications with host server. Alternatively, the client device may interact with a vendor server that executes a server-side application for managing communications with the host server. In response to a request from the consumer, the host server may filter selected consumer information elements from the information account and transmit the filtered consumer information elements to the client-side or server-side application. The filtered consumer information elements may then be automatically integrated into a vendor business process on behalf of the consumer, if desired.

89 Claims, 7 Drawing Sheets

U.S. PATENT DOCUMENTS

| | | | |
|---|---|---|---|
| 5,983,208 | A | 11/1999 | Haller et al. |
| 6,005,939 | A | 12/1999 | Fortenberry et al. ........... 380/21 |
| 6,052,710 | A * | 4/2000 | Saliba et al. ................ 709/203 |
| 6,073,106 | A | 6/2000 | Rozen et al. ................... 705/3 |
| 6,125,352 | A | 9/2000 | Franklin et al. .............. 705/26 |
| 6,154,768 | A | 11/2000 | Chen et al. |
| 6,192,380 | B1 | 2/2001 | Light et al. ................. 707/505 |
| 6,199,079 | B1 | 3/2001 | Gupta et al. ................ 707/507 |
| 6,208,659 | B1 | 3/2001 | Govindarajan et al. ..... 370/410 |
| 6,233,608 | B1 | 5/2001 | Laursen et al. ............ 709/217 |
| 6,243,688 | B1 | 6/2001 | Kalina |
| 6,247,029 | B1 | 6/2001 | Kelley et al. ............... 707/507 |
| 6,253,203 | B1 | 6/2001 | O'Flaherty et al. ............ 707/9 |
| 6,298,347 | B1 | 10/2001 | Wesley ........................ 707/10 |
| 6,321,339 | B1 | 11/2001 | French et al. |
| 6,356,905 | B1 | 3/2002 | Gershman et al. |
| 6,385,596 | B1 * | 5/2002 | Wiser et al. .................. 705/51 |
| 6,401,085 | B1 | 6/2002 | Gershman et al. |
| 6,491,217 | B2 | 12/2002 | Catan |
| 6,571,279 | B1 | 5/2003 | Herz et al. |
| 6,571,285 | B1 | 5/2003 | Groath et al. |
| 6,584,448 | B1 * | 6/2003 | Laor ........................... 705/14 |
| 6,665,704 | B1 * | 12/2003 | Singh ......................... 709/203 |
| 6,725,050 | B1 | 4/2004 | Cook |
| 6,845,370 | B2 | 1/2005 | Burkey et al. |
| 2001/0011250 | A1 | 8/2001 | Paltenghe et al. ............ 705/41 |
| 2002/0002684 | A1 | 1/2002 | Fox et al. ................... 713/200 |
| 2002/0107972 | A1 | 8/2002 | Keane |
| 2002/0198818 | A1 * | 12/2002 | Scott et al. ................... 705/37 |

OTHER PUBLICATIONS

Microsoft.NET Passport, "What's New", Sep. 2001 entire article.
Webpage entitled: "Free Password Manager—Store passwords—Desktop or Online", available at www.passwordsafe.com, 1 page.
Secure Your Web Site With Passport, "Implement Passport", *Visual Studio Magazine*, pp. 1-3.
Jon Rauschenberger, Secure Your Web Site With Passport, "Simplify Your Web Site Visitors' Experience By Authenticating Them", *Visual Studio Magazine*, pp. 1-3.
Secure Your Web Site With Passport, "Sign In, Please", *Visual Studio Magazine*, pp. 1-3.
Secure Your Web Site With Passport, "Passport Key to HailStorm's Success", *Visual Studio Magazine*, pp. 1-2.
*Implementing Moble Passport*, pp. 1-5.
Webpage entitled: "Zkey—Corporate", available at www.zkey.com, 1 page.
Alan Cohen and Walaika Haskins, "Grab-and-Go Web", *PC Magazine*, Oct. 19, 2000, pp. 1-3.
Webpage entitled: LinkUall.com—Products—Calendars and Address books, available at www.linkuall.com, pp. 1-2.
Webpage entitled: "LinkUall.com—About Us—LinkUall Technology", available at www.linkuall.com, 1 page.
Microsoft PressPass, Microsoft.NET: "A Platform for the Next Generation Internet", Jun. 22, 2000, pp. 1-7.
Microsoft Press Release. "Microsoft Passport Offers Streamlined Purchasing Across Leading Web Sites", Oct. 11, 1999, pp. 1-4.
Graeme Bennett, PC Buyer's Guide.com., (updated Jun. 22, 2000), "NGWS—Microsoft's Dot Net Strategy", pp. 1-5.
Webpage entitled: "Microsoft Passport: A single name, password and wallet for the web", available at www.passport.com, pp. 1-2.
Webpage entitled: "Microsoft Passport *Member Services*, What is Passport", available at www.passport.com, pp. 1-12.
Webpage entitled: "Microsoft Passport: Streamlining Commerce and Communication on the Web", available at www.passport.com, Oct. 11, 1999, pp. 1-3.
Webpage entitled: "Online Businesses Use Microsoft Passport Single Sign-In and Wallet Services to Provide Customers with Secure and Convenient Shopping", available at www.microsoft.com, May 17, 2000, pp. 1-2.

Garry Gunnerson, "EZ Login", *PC Magazine*, pp. 1-2, Mar. 14, 2000.
"Ezlogin.Com Introduces Liveclips, Enabling Net Users To Clip Content From Anywhere On The Web And Paste It On A Custom Page", Java Industry Connection, Mar. 8, 2000, pp. 1-2.
Webpage entitled: "724 Solutions—Products—Wireless Internet Platform", available at www.724.com, pp. 1-3.
Webpage entitled: "724 Solutions—Products—m-Commerce", available at www.724.com, pp. 1-4.
Webpage entitled: "724 Solutions—Products—Financial Services", available at www.724.com,1 page.
Gator Press Release "Gator.Com Delivers on the Promise of the Electronic Commerce Modeling Language (ECML) Standard Today: Gator offers one-click shopping at over 5,000 e-commerce sites today", Jun. 14, 1999, pp. 1-2.
Gator Press Release "Internet Start-up Gator.com Introduces Gator, the Web's First Smart Online Companion: New Internet product offers one-click login and express registration and checkout across the web", Jun. 14, 1999, pp. 1-3.
Gator Press Release "Gator Helps Consumers at More Than 25,000 E-Commerce and Registration Sites in First Month of Usage: Software an invaluable companion For more than 80,000 online consumers", Aug. 3, 1999, pp. 1-2.
Webpage entitled: "Affiliate Application" *How do Gator, Price Helper, and OfferCompanion Work?*, available at www.gator.com, 1 page.
Webpage entitled: "Yodlee: e-Personalization Solutions", available at www.yodlee.com, pp. 1-2.
Webpage entiled: "Yodlee: e-Personalization Platform", available at www.yodlee.com, 1 page.
Webpage entitled: "Yodlee: e-Personalization Applications", available at www.yodlee.com, 1 page.
Webpage entitled: "Yodlee for Web: One-Click Access to All Personal Accounts", available at www.yodlee.com, 1 page.
Webpage entitled: "Yodlee for Mobile: Simplify Your Life on the Road with Yodlee2Go", available at www.yodlee.com, 1 page.
Webpage entitled: "Yodlee2Go: Palm OS Wireless", available at www.yodlee.com, 1 page.
Webpage entitled: "Yodlee2Go: Web-enabled Phones", available at www.yodlee.com, 1 page.
Webpage entitled: "Security Overview", available at www.yodlee.com, pp. 1-2.
Webpage entitled: "Co-Brand Partner Opportunities", available at www.yodlee.com, pp. 1-2.
Webpage entitled: "Content Partner Opportunities", available at www.yodlee.com, 1 page.
Webpage entitled: "Sweet Enonymity", available at www.enonymous.com, pp. 1-2.
Webpage entitled: "Vision For An Enonymous Infomediary", available at www.enonymous.com, pp. 1-3.
Webpage entitled: "Learn More", available at www.digitalme.com, pp. 1-2.
Webpage entitled: "Take Control", available at www.digitalme.com, pp. 1-2.
Webpage entitled: "Make it Convenient", available at www.digitalme.com, pp. 1-3.
Webpage entitled: "Create Relationships", available at www.digitalme.com, pp. 1-2.
Webpage entitled: "FAQ", available at www.digitalme.com, pp. 1-2.
Webpage entitled: "Digitalme™ Fact Sheet (www.digitalme.com)" available at www.digitalme.com, pp. 1-3.
"Choicepoint Unveils New Web-based Pre-employment Screening Service", BusinessWire p. 1287, May 17, 1999.
Webpage entitled: "Free Password Manager—Store passwords—Desktop or Online", available at www.passwordsafe.com, 1 page, [Oct. 10, 2001].
Secure Your Web Site With Passport, "Implement Passport", *Visual Studio Magazine*, pp. 1-3, [Apr. 4, 2002].
Jon Rauschenberger, Secure Your Web Site With Passport, "Simplify Your Web Site Visitors' Experience By Authenticating Them", *Visual Studio Magazine*, pp. 1-3, [Apr. 4, 2002].
Secure Your Web Site With Passport, "Sign In, Please", *Visual Studio Magazine*, pp. 1-3, [Apr. 4, 2002].

Secure Your Web Site With Passport, "Passport Key to HailStorm's Success", *Visual Studio Magazine*, pp. 1-2, [Apr. 4, 2002].
*Implementing Moble Passport*, pp. 1-5, [Oct. 10, 2001].
Webpage entitled: "Zkey—Corporate", available at www.zkey.com, 1 page, [Oct. 10, 2001].
Alan Cohen and Walaika Haskins, "Grab-and-Go Web", *PC Magazine*, Oct. 19, 2000, pp. 1-3.
Webpage entitled: LinkUall.com—Products—Calendars and Address books, available at www.linkuall.com, pp. 1-2, [Oct. 10, 2001].
Webpage entitled: "LinkUall.com—About Us—LinkUall Technology", available at www.linkuall.com, 1 page, Jun. 2000.
Microsoft PressPass, Microsoft.NET: "A Platform for the Next Generation Internet", Jun. 22, 2000, pp. 1-7.
Microsoft Press Release. "Microsoft Passport Offers Streamlined Purchasing Across Leading Web Sites", Oct. 11, 1999, pp. 1-4.
Graeme Bennett, PC Buyer's Guide.com., (updated Jun. 22, 2000), "NGWS—Microsoft's Dot Net Strategy", pp. 1-5, [Aug. 3, 2001].
Webpage entitled: "Microsoft Passport: A single name, password and wallet for the web", available at www.passport.com, pp. 1-2, [Aug. 3, 2001].
Webpage entitled: "Microsoft Passport *Member Services*, What is Passport", available at www.passport.com, pp. 1-12, [Aug. 3, 2001].
Webpage entitled: "Microsoft Passport: Streamlining Commerce and Communication on the Web", available at www.passport.com, Oct. 11, 1999, pp. 1-3.
Webpage entitled: "Online Businesses Use Microsoft Passport Single Sign-In and Wallet Services to Provide Customers with Secure and Convenient Shopping", available at www.microsoft.com, May 17, 2000, pp. 1-2.
Garry Gunnerson, "EZ Login", *PC Magazine*, pp. 1-2, Mar. 14, 2000.
"Ezlogin.Com Introduces Liveclips, Enabling Net Users To Clip Content From Anywhere On The Web And Paste It On A Custom Page", Java Industry Connection, Mar. 8, 2000, pp. 1-2.
Webpage entitled: "724 Solutions—Products—Wireless Internet Platform", available at www.724.com, pp. 1-3, [Sep. 6, 2001].
Webpage entitled: "724 Solutions—Products—m-Commerce", available at www.724.com, pp. 1-4, [Sep. 6, 2001].
Webpage entitled: "724 Solutions—Products—Financial Services", available at www.724.com,1 page, [Sep. 6, 2001].
Gator Press Release "Gator.Com Delivers on the Promise of the Electronic Commerce Modeling Language (ECML) Standard Today: Gator offers one-click shopping at over 5,000 e-commerce sites today", Jun. 14, 1999, pp. 1-2.
Gator Press Release "Internet Start-up Gator.com Introduces Gator, the Web's First Smart Online Companion: New Internet product offers one-click login and express registration and checkout across the web", Jun. 14, 1999, pp. 1-3.
Gator Press Release "Gator Helps Consumers at More Than 25,000 E-Commerce and Registration Sites in First Month of Usage: Software and invaluable companion For more than 80,000 online customers", Aug. 3, 1999, pp. 1-2.
Webpage entitled: "Affiliate Application" *How do Gator, Price Helper, and OfferCompanion Work?*, available at www.gator.com, 1 page, [Sep. 6, 2001].
Webpage entitled: "Yodlee: e-Personalization Solutions", available at www.yodlee.com, pp. 1-2, [Sep. 6, 2001].
Webpage entitled: "Yodlee: e-Personalization Platform", available at www.yodlee.com, 1 page, [Sep. 6, 2001].
Webpage entitled: "Yodlee: e-Personalization Applications", available at www.yodlee.com, 1 page, [Sep. 6, 2001].
Webpage entitled: "Yodlee for Web: One-Click Access to All Personal Accounts", available at www.yodlee.com, 1 page, [Sep. 6, 2001].
Webpage entitled: "Yodlee for Mobile: Simplify Your Life on the Road with Yodlee2Go", available at www.yodlee.com, 1 page, [Sep. 6, 2001].
Webpage entitled: "Yodlee2Go: Palm OS Wireless", available at www.yodlee.com, 1 page, [Sep. 6, 2001].
Webpage entitled: "Yodlee2Go: Web-enabled Phones", available at www.yodlee.com, 1 page, [Sep. 6, 2001].
Webpage entitled: "Security Overview", available at www.yodlee.com, pp. 1-2, [Sep. 6, 2001].
Webpage entitled: "Co-Brand Partner Opportunities", available at www.yodlee.com, pp. 1-2, [Sep. 6, 2001].
Webpage entitled: "Content Partner Opportunities", available at www.yodlee.com, 1 page, [Sep. 6, 2001].
Webpage entitled: "Sweet Enonymity", available at www.enonymous.com, pp. 1-2, [Sep. 6, 2001].
Webpage entitled: "Vision For An Enonymous Infomediary", available at www.enonymous.com, pp. 1-3, [Sep. 6, 2001].
Webpage entitled: "Learn More", available at www.digitalme.com, pp. 1-2, [Sep. 6, 2001].
Webpage entitled: "Take Control", available at www.digitalme.com, pp. 1-2, [Sep. 6, 2001].
Webpage entitled: "Make it Convenient", available at www.digitalme.com, pp. 1-3, [Sep. 6, 2001].
Webpage entitled: "Create Relationships", available at www.digitalme.com, pp. 1-2, [Sep. 6, 2001].
Webpage entitled: "FAQ", available at www.digitalme.com, pp. 1-2, [Sep. 6, 2001].
Webpage entitled: "Digitalme™ Fact Sheet (www.digitalme.com)" available at www.digitalme.com, pp. 1-3, [Sep. 6, 2001].

* cited by examiner

```
<XML>                                                               110
<Information Account>
    <Account_Name> John Doe_5 </Account_Name>
    <Account_No> 34153443.3.2 </Account_No>
    <Name>
        <First_Name> John </First_Name>        ⎫
        <Last_Name> Doe </Last_Name>            ⎬ 206
        <Middle_Name> Michael </Middle_Name>    ⎪
        <Title> Mr. </Title>                    ⎪
        <Suffix> Jr. </Suffix>                  ⎭
    </Name>
    <DOB>
        <DOB_Month> January </DOB_Month>
        <DOB_Day> 1 </DOB_Day>
        <DOB_Year> 1960 </DOB_Year>
    </DOB>                              208
    <Personal_Contact_Info>
        <Home_Phone preferred="yes"> 555.555.555 </Home_Phone>
        <Work_Phone> 555.555.1111 </Work_Phone>
        <Cell_Phone> 222.333.444 </Cell_Phone>
        <Home_Email> doe@homeisp.com.</Home_Email>
        <Work_Email> jdoe@workisp.com.</Work_Email>
        <Home_Address1>
            .
            .
            .
            .</Home_Address1>
        .
        .
    </Personal Contact_Info>

<My_Documents>
        <Doc1>
            .
            .
            .
        </Doc1>
        .
        .
        .
    <My_Documents>
    .
    .
    .
</Information Account>
</XML>
```

204 — <Account_No>
202 — <Name>
206 — (First_Name through Suffix)
208 — <Personal_Contact_Info>

FIG. 2

STORAGE, MANAGEMENT AND DISTRIBUTION OF CONSUMER INFORMATION

The present application claims the benefit of the following United States provisional patent applications: U.S. Provisional Patent Application Ser. No. 60/223,232, filed Aug. 4, 2000; U.S. Provisional Patent Application Ser. No. 60/226,117, filed Aug. 18, 2000; U.S. Provisional Patent Application Ser. No. 60/238,847 filed Oct. 6, 2000; U.S. Provisional Patent Application Ser. No. 60/245,867 filed Nov. 7, 2000; and U.S. Provisional Patent Application Ser. No. 60/253,298 filed Nov. 27, 2000, all of which are hereby incorporated by reference as if set forth fully herein.

TECHNICAL FIELD

The field of the present invention relates generally to systems and methods for the storage, management, and delivery of user or consumer information on or over a network.

BACKGROUND OF THE INVENTION

As information technology and network technology become more prolific, people find themselves repeatedly and manually inputting the same data into different computer systems. For example, consumers may find themselves having to manually input their personal and billing information via each vendor website through which they choose to complete an electronic commerce ("e-commerce") or mobile commerce ("m-commerce") transaction. As the number of secure websites grows, consumers also find themselves having to manage numerous usernames and passwords. Thus, there is a need for a convenient and secure system for automating the management of consumer information.

Automated or partially automated solutions for managing information historically have largely been localized processes. Using conventional techniques, users are able to create and store data files containing personal information on their personal computers or other client devices, such as personal digital assistants ("PDAs"), pagers, mobile telephones, etc. The data elements in such data files can be shared using specialized applications for filtering data out of the data file and into another application. However, such systems typically require a permanent download of proprietary data management software that might not be compatible among different devices. In addition, the data management software and data files are often stored on only a single personal computer or computerized device. If the personal computer or other computerized device becomes lost or stolen, the user's data may no longer be accessible, and might end up in the possession of another person. If the personal computer or other computerized device crashes, the data can easily be lost.

Accordingly, there remains a need for a more secure, flexible and convenient system for storing information and a method for allowing the user to manage and distribute that information using a personal computer or other network-connected device. There further remains a need for such a system and method that provides central information storage and does not require a permanent download of proprietary software to a client device for management and distribution of the information.

SUMMARY OF THE INVENTION

The present invention generally relates to systems and computer-implemented methods and associated computer-readable media for storing, managing and distributing consumer information. According to certain embodiments, an information account is stored in a central data repository accessible via a network. The information account may comprise a plurality of consumer information elements associated with a consumer. The consumer information elements are preferably, but need not be, stored in a tagged data format.

In accordance with one embodiment, a host server hosting a database management system for accessing the information account receives a request from a network device, responsive to an input command supplied by the consumer, for selected consumer information elements. In response to the request, the host server may filter the selected consumer information elements from the information account and transmit the filtered consumer information elements to the network device. The selected consumer information elements may be filtered from the information account using a style sheet or other suitable filtering mechanism.

In various embodiments, the request for selected consumer information elements may also include consumer authentication information. Prior to filtering the selected consumer information elements from the information account, the host server may authenticate the consumer based on the authentication information. The consumer may, in certain embodiments, be authenticated while accessing a first web page file and a single sign-on mechanism may be invoked so that the consumer will not be required to resubmit the consumer authentication information upon accessing a subsequent web page file prior to expiration of a time-out period.

According to one or more embodiments, the network device may comprise a client device executing a browser. The browser may access a web page file that includes an instruction that causes the browser to request a client-side application from the host server. Preferably, the client-side application temporarily resides on the client device and is configured to manage the request/response process for the network device. The client-side application may receive the filtered consumer information elements from the host server and integrate the filtered consumer information elements into a vendor's business process on behalf of the consumer. For example, the client-side application may auto-populate the filtered consumer information elements into at least one input field of the web page file and may allow the consumer to interact with the browser in order to submit the auto-populated web page file to the vendor server for processing. The consumer may edit the auto-populated consumer information elements or input additional consumer information elements. The client-side application may transmit the edited or added consumer information elements to the host server for storage in the information account.

In alternative embodiments, the network device may comprise a vendor server interacting with a client device. In such embodiments, the vendor server may execute a server-side application for interacting with the database management system of the host server. The server-side application may receive the filtered consumer information elements from the database management system and integrate the filtered consumer information elements into a vendor's business process on behalf of the consumer. For example, the server-side application may auto-populate the filtered consumer information elements into at least one input field of the web page file and may transmit the auto-populated web page file to the browser for display to the consumer. Any edits or additions to the consumer information elements that are made by the consumer may be passed to the server-side application and then on to the host server for appropriate storage in the information account. Further attributes and advantages will become apparent from the following detailed description of certain exemplary embodiments, the appended drawings and the claims.

BRIEF DESCRIPTION OF THE DRAWINGS

FIG. 2 is an abstract illustration of an information account in accordance with exemplary embodiments of the present invention as may be used, for example, in the system illustrated in FIG. 1.

DETAILED DESCRIPTION OF EXEMPLARY EMBODIMENTS

Figure 1:
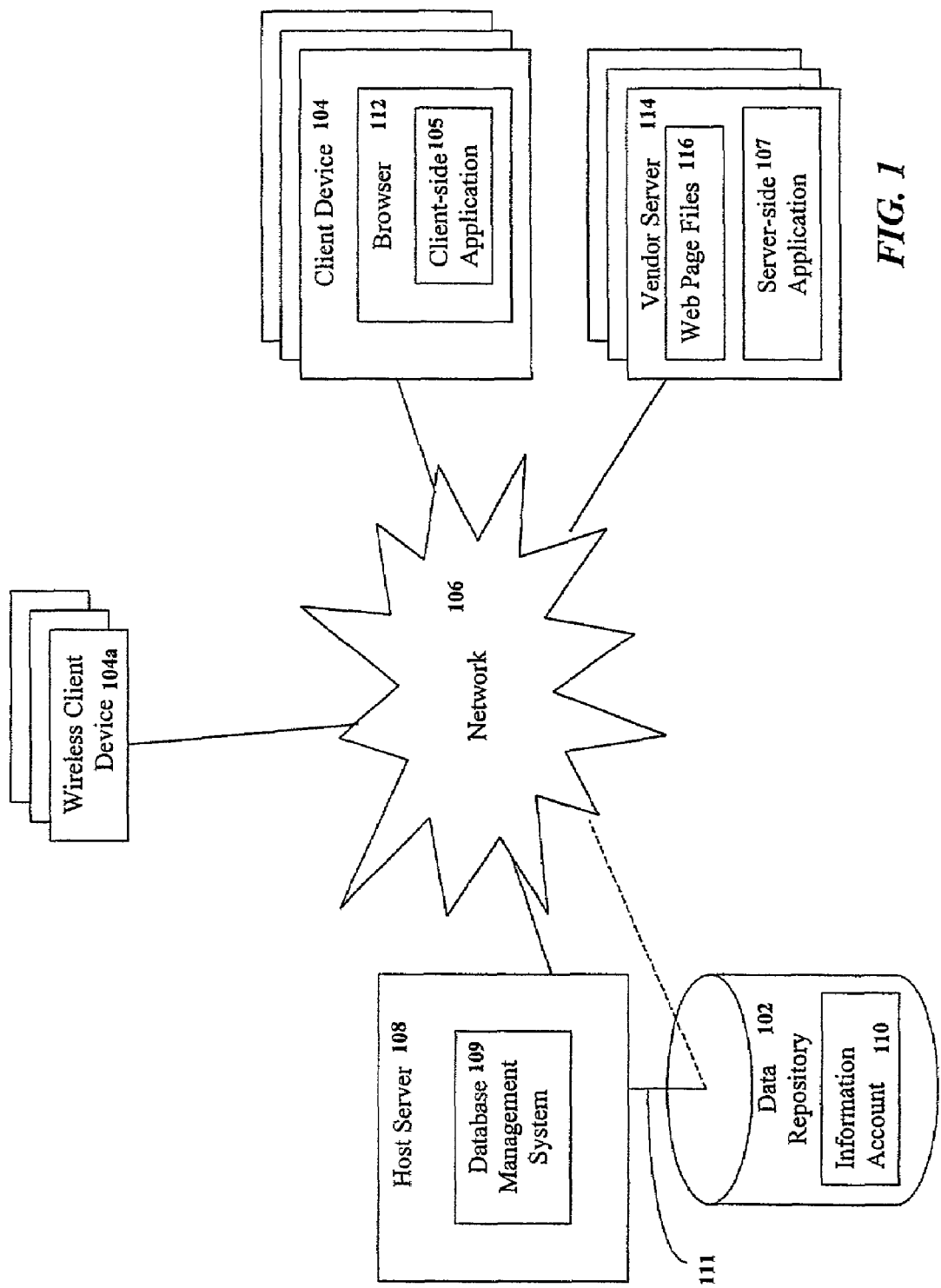
FIG. 1 is a high-level block diagram illustrating a system in accordance with one or more exemplary embodiments of the present invention as disclosed herein.

In one or more embodiments, a system and method are provided for enabling consumers to store and maintain a comprehensive information profile (hereinafter "information account") in a centralized data repository that is accessible over a distributed electronic network, such as the Internet. The information account may be used to store any type of data desired by the consumer, including, for example, demographic information, financial information, medical information, family information, contact information, documents, multimedia files, etc. The centralized data repository is preferably accessible via a network by any authorized network device. In various embodiments, no specialized application programs are required to be permanently downloaded to the consumer's network device in order to access the information account.

According to certain embodiments, at the consumer's direction, selected information in the information account may be accessed and, if desired, shared with authorized vendors, business partners or any other entity that requires certain of the consumer's information. The terms "vendor" and "business partner" are used herein in a general sense to refer to persons, businesses, enterprises or entities that make products or services available to consumers. As used herein, the terms "consumer," "buyer," and "user" are interchangeable.

Server-side software or temporary client-side software may, in some embodiments, be used to manage communications with the information account and to automatically integrate that consumer information into a process executed by a network device. As an example, the network device may execute a business process relating to a consumer-initiated activity, such as a retail transaction. The server-side software or temporary client-side software may receive consumer information from the information account and use that information to automatically populate the input fields of a form that is to be submitted to a vendor's server or other network device during an application, registration or transaction process.

The data in the information account is preferably stored using a tagged data format. In one embodiment, the data in the information account may be stored using the eXtensible Markup Language (XML) data format, which is an open standard for describing data from the World Wide Web Consortium ("W3C"). As is known in the art, XML tags are used to define the types of information that are represented by the data element. The XML standard provides a great deal of flexibility in that custom tags may be defined for any type of information that the consumer may desire to store in the information account. Using any well-known XML-related querying, parsing, transforming and/or filtering techniques, individual data elements in the information account may be accessed, updated, deleted, created, or otherwise manipulated.

The information account may be structured as one or more data aggregates, e.g., XML data aggregates. An entire XML data aggregate is stored within a data field of a database table. This data field is a long text field containing all of the information associated with the given record. In one embodiment, all consumer information in the information account may be stored in a single XML data aggregate comprising consumer information elements and sub-elements. Attributes may also be associated with any element and sub-element in order to provide additional information. A transformation or filtering mechanism, such as "Style Sheets," may be applied to the single XML data stream in order to extract only selected data elements therefrom at the direction of the consumer.

In an alternative embodiment, the information account may be normalized into a plurality of discrete data aggregates, each aggregate representing a predetermined "information product." An information product refers to a package of consumer information relating to a specific product or service offered by a vendor. For example, a mortgage information product might contain all consumer information that would be required to complete a lender's mortgage application. Individual information products may be retrieved from the information account and transmitted by to authorized vendors at the request of the consumer.

Access constraints implemented in a system of the present invention according to one or more embodiments as described herein allow for the establishment of "exchanges." An exchange refers to a group of entities that are authorized to accept consumer information from the information account at the request of the consumer. In other words, the information account may be used to retrieve information for use in commerce with any vendor that is a member of the exchange. In much the same way that a consumer may have several different credit cards or debit cards that are each accepted only by certain merchants, the consumer may have several information accounts that are each valid only on specified exchanges.

Exchanges may be accomplished through inflow and/or outflow constraints. An inflow constraint implemented by an exchange may, for example, dictate that only information accounts associated with specific other exchanges will be accepted or that no information accounts associated with other exchanges will be accepted. An outflow constraint may dictate that information accounts associated with an exchange may only be used within that exchange and within no other exchanges. Various business situations and partnerships, may drive the implementation of inflow and outflow constraints. Revenue sharing models may be established in order to provide financial incentives to exchanges and/or individual vendors that facilitate the creation of an information account or the use of an information account to complete a transaction.

Exemplary embodiments of the present invention will now be described with reference to the drawings, in which like numerals represent like elements throughout the several figures. A high-level block diagram of a system in accordance with an exemplary embodiment of the present invention is shown in and described with reference to FIG. 1. As shown, a central data repository 102 is provided for storing consumer information that may be easily accessed from any network device attached to the network 106. The network 106 may comprise any telecommunication and/or data network, whether public or private, such as a local area network, a wide area network, an intranet, an internet and any combination thereof and may be wireline and/or wireless. Various methodologies as described herein may be practiced in the context of distributed computing environments. The network 106 thus provides for the open and seamless distribution of consumer information to and from the information account 110.

In the system illustrated in FIG. 1, the exemplary operating environment encompasses various network devices for accessing and reading associated computer-readable media having stored thereon data and/or computer-executable instructions for implementing various methods of the present invention of data storage, management and distribution. Generally, a network device includes a communication device for transmitting and receiving data and/or computer-executable instructions over the network 106, and a memory for storing data and/or computer-executable instructions. A network device may also include a processor for processing data and executing computer-executable instructions, as well as other internal and peripheral components that are well known in the art (e.g., input and output devices.) As used herein, the term "computer-readable medium" describes any form of computer memory or a propagated signal transmission medium. Propagated signals representing data and computer-executable instructions are transferred between network devices.

A network device may generally comprise any device that is capable of communicating with the resources of the network 106. A network device may comprise, for example, a network server 108 & 114, a client device 104, a wireless client device 104a or a dedicated storage device (e.g., the central data repository 102.) In the embodiment shown in FIG. 1, a host server 108 hosts the software for interacting with the central data repository 102 and for communicating with other network devices. The host server 108 may interact with the central data repository 102 via the network 106 or via a direct communication link 111. A vendor server 114 hosts vendor web page files 116 comprising a vendor website, through which products or services may be offered to consumers.

A client device 104 may comprise a desktop computer, a laptop computer and the like. A wireless client device 104a may comprise a personal digital assistant (PDA), a digital and/or cellular telephone or pager, a handheld computer, or any other mobile device. These and other types of client devices 104 & 104a will be apparent to one of ordinary skill in the art. For convenience, the following explanation will be made with reference to a client device 104 generically, but, unless otherwise indicated, it will be understood that the principles and concepts described will also encompass wired or wireless devices, such as wireless client device 104a illustrated in FIG. 1. Moreover, although exemplary embodiments will be described herein in the context of the Internet or a web-based environment, it will be appreciated that the various principles and methods of operation will be applicable or may be practiced in other environments as well.

According to a preferred embodiment, a client device 104 may execute a browser 112 or another suitable application for interacting with web page files 116 hosted by a vendor server 114 and other network devices. Through the graphical user interface provided by a displayed web page file 116, the vendor may require the consumer (i.e., the operator of the client device 104) to input certain information pertaining to or associated with the consumer. The present invention allows the consumer to direct that the requested information be transmitted from the information account 110 to the client device 104 for processing. Although exemplary embodiments of the present invention will be described herein in the context of a web-based environment, those skilled in the art will appreciate that other environments are suitable as well.

The description of exemplary embodiments with reference to FIG. 1 assumes the existence of a previously created information account 110. An example illustrating actual creation of an information account 110 will be described below with reference to FIG. 6. In general, the information account 110 may be any data structure for storing consumer information. Preferably, however, the information account 110 is stored as a tagged data structure, such as one or more XML data aggregates. The data in the information account 110 is preferably encrypted so that anyone gaining unauthorized access to the information account 110 will not be able to read the data. Also, in a preferred embodiment, each information account 110 in the central data repository 102 is encrypted separately, so that someone authorized to access the information account of one consumer may not also gain access to the information account of another consumer.

In accordance with a preferred embodiment, the consumers may maintain sole responsibility for storing and updating the information in the information account 110. Only the consumer, or those authorized by the consumer, may use the information account 110 to complete e-commerce or m-commerce activities. Consumers create an information account 110 either through a website hosted by the host server 108 or a website hosted by a vendor server 114. For example, after manually completing a form displayed by a vendor's website, the consumer can choose to create an information account 110 and have the consumer information stored therein.

Upon creation of an information account 110, a consumer may be given an identification number, a username and/or a password. Other types of consumer authentication information are known in the art and may also be used in the context of the present invention. The system of FIG. 1 provides the consumer with a variety of methods of accessing the information account 110, transferring selected information to a vendor and/or allowing a vendor limited and constrained access to the information account 110, as described in further detail herein.

In one embodiment of the present invention, a single sign-on mechanism may be provided to allow a consumer to "sign-on" (provide username and password, etc.) for authentication to access an information account 110 at only a first website. The authentication status may then "follow" the consumer as the consumer accesses subsequent websites. At such subsequent websites, a consumer who has activated the single sign-on mechanism will not be asked to re-authenticate himself. For example, the host server 108 may maintain an authentication table (not shown) that records the consumer authentication information, the sign-on time and a browser identifier. When the consumer accesses a subsequent website that requires sign-on for accessing the information account 110, the client-side application 105 may communicate the browser identifier to the host server 108. The host server 108 may use the browser identifier to look up the consumer authentication information and previous sign-on time in the authentication table. The previous sign-on time may be compared to the current time in order to determine whether a time-out interval has expire. If the time-out interval has not expired, the host server 108 may acknowledge that the consumer is authenticated.

A web page file 116 displayed by the browser 112 may include input fields for the input of consumer information. The web page file 116 may also include an instruction (e.g., a "call") that causes the browser 112 to download and execute a client-side application 105. JAVA applets are well known client-side applications and are particularly suited for use in various embodiments due to their platform-independent nature. However, any other type of client-side application may be used without departing from the spirit and scope of the present invention. The client-side application 105 resides in temporary memory storage of the client device 104, such as cache memory or the like, and may be removed from the client device 104 after its execution is complete. The client-side application 105 is specific to the browser session only and not to the client device 104. Multiple client-side applications 105 may be executed at the same time if multiple browser windows are executed by the client device 104. The client-side application 105 provides functionality for facilitating communications between the browser 112 executed by the client device 104 and the database management system ("DBMS") 109 of the host server 108.

One responsibility of the client-side application 105 is to provide authentication information associated with the consumer and the vendor to the host server 108. Depending on the desired level of security within the system, authentication information may comprise a username, user ID, password, key, certificate and the like. Authentication information regarding the vendor may be embedded within the web page file 116 for extraction by the client-side application 105. Alternatively, the client-side application 105 may communicate with the vendor server 114 to retrieve such vendor authentication information. Authentication information regarding the consumer may be supplied by the consumer via a user interface displayed by the client-side application 105. Communications relating to authentication information may be accomplished using a secure transmission protocol or handshake, such as the secure shell BSD, Point to Point Tunneling Protocol (PPTP), also commonly know as Virtual Private Network, and/or secure socket layering (SSL) protocol. Other methods for achieving a secure connection over the network 106 will be apparent to those of ordinary skill in the art. Authentication information may also be encrypted and transmitted over an open network using any appropriate protocol.

The client-side application 105 is also responsible for determining the type of consumer information that is required by the input fields of the displayed web page file 116. After determining the type of consumer information that is required, the client-side application 105 may formulate a database query in a language that is understood by the DBMS 109. At a minimum, client-side application 105 communicates enough information to the DBMS 109 regarding the required consumer information so that the DBMS can formulate a database query. In one embodiment, the DBMS 109 exposes an application program interface ("API") that can be utilized by the client-side application 105. An example of one such API is known as the Simple Object Access Protocol ("SOAP"). SOAP is a protocol that provides for interoperability between heterogeneous HTTP-based software and XML-based software. SOAP provides access to services, objects, and servers in a platform-independent manner. Since SOAP relies on HTTP as the transport mechanism, and most firewalls allow HTTP to pass through, SOAP endpoints may usually be invoked from either side of a firewall.

The client-side application 105 may transmit the database query (or information to form the database query) to the host server 108 along with the above-mentioned authentication information over a secure connection. In such a scenario, the authentication information and the query information may be passed to the DBMS 109. The DBMS 109 attempts to authenticate the vendor and the consumer using the authentication information and corresponding information that was previously stored in the data repository 102. If authentication is successful, the DBMS 109 queries the information account 110 using the appropriate database connectivity protocol, such as the Open Database Connectivity ("ODBC") protocol, the Java Database Connectivity Protocol ("JDBC"), or any other suitable protocol.

As mentioned above, the data in the information account 110 may be encrypted. Thus, in response to the query, the DBMS 109 may receive an encrypted search result. The search result, for example, may be in the form of a stream of XML data that has been filtered from the information account. The DBMS 109 or other program module executed by the host server 108 may be responsible for decrypting the search result. The decrypted search results may then be transmitted to the client-side application 105 via the previously established or a new secure connection.

In the alternative, the client-side application 105 may manage authentication and querying as separate processes. As an example, authentication may be handled using a secure connection as described above. Upon acknowledgment of authentication, the secure connection may be closed and the query process may be handled using open network communication protocols. In response to the query, the encrypted search result may be transmitted to the client-side application 105 over the open network and the client-side application 105 may be responsible for decryption.

The client-side application 105 may also be responsible for parsing the data elements included in the search result and auto-populating the parsed data into the input fields of the displayed web page file 116. Again, the client-side application 105 may translate the XML data into HTTP data using SOAP or another suitable protocol. Those skilled in the art will appreciate that in certain embodiments, especially where user verification of the consumer information is not required, the client-side application 105 may transmit the consumer information directly to the vendor server 114 without populating the consumer information into the displayed web page file 116. If the input fields are auto-populated, the consumer has the opportunity to verify the information displayed in the input fields, make any necessary modifications, and then interact with the displayed web page file 116 to submit the information to the vendor server 114. Any modifications to the consumer information that are made by the consumer may be detected by the client-side application 105, which may then transmit the modified data back to the host server 108 for an appropriate update of the information account 110. In addition, the client-side application 105 may determine whether the consumer inputs new data into the input fields, and if so, transmit that new information to the host server 108 for storage in the data repository 102. The consumer may interact with the displayed web page file 116 to submit the consumer information to the vendor server 114. The vendor server 114 may then process the consumer information, as needed, by way of a processing module.

In an alternative embodiment, a server-side application 107 may be employed instead of a client-side application 105 to manage communications with the host server 108. An authorized server-side application 107 may receive consumer information directly from the host server 108 and present that consumer information to the client device 104 (e.g., via the browser 112) for display to the consumer. A web page file 116 hosted by the vendor server 114 may be accessed and displayed by the browser 112 of the client device 104. The displayed web page file 116 may present a user interface for input of consumer authentication information. In a preferred embodiment, the consumer authentication information is transmitted from the client device 104 to the host server 108 for authentication of the consumer. In addition, the client device 104 may also transmit a request that a "ticket" be provided to the vendor server 114.

As used herein, the term "ticket" refers to a temporary authorization for at least partial access to a consumer's information account 110. Although not shown in the figure, an information account 110 may be associated with a data table or other data structure that correlates one or more tickets with a set of consumer-defined attributes. The consumer-defined attributes may determine such things as the number of times that the password may be used to access the information account 110 (e.g., one-time use), any period of validity associated with the ticket (e.g., ticket expires one week from issuance), whether the ticket carries read, write and/or modify privileges, etc. The ticket attributes may also include any number of identifiers, such as a vendor identifier, a data identifier, and filter identifiers, which may be used to ensure that the party using the ticket is in fact authorized to do so, and to ensure that only authorized data is filtered for release to that party.

Upon authenticating the consumer, for example by using standard browser authentication techniques, the host server 108 may redirect the browser 112 of the client device 104 to another web page data file 116 (e.g., another web page data file 116 hosted by of the vendor server 114), including the ticket as a parameter in the URL. In response to detecting the ticket, the vendor server may extract the ticket and pass it to the server-side application 107. The server-side application 107 may then use the ticket to authenticate itself to the host server 108, for example using SOAP or another suitable protocol.

In accordance with one embodiment of the present invention as described herein, a ticket generated by the host server 108 may be a "Globally Unique Identifier" ("GUID"). A GUID is a unique number that is computed by adding the time and date to a network adapter's internal serial number. Other unique identifiers may also be used as tickets in accordance with the present invention. The ticket may be encrypted. For example, the ticket may be encrypted using the vendor's public key and the resulting binary encrypted blob may be base64 encoded such that so that it can be included as a parameter in a URL. At the vendor server 114, the parameter would need to be extracted from the URL, base64 decoded and then decrypted using the vendor's private key. These and other encryption methods will be apparent to one of ordinary skill in the art.

In an alternative embodiment, consumer authentication information may be submitted from the client device 104 to the server-side application 107 at the vendor server 114. The server-side application 107 may then transmit the consumer authentication information and vendor authentication information to the host server 108 for authentication of both the consumer and the vendor. The consumer authentication information may be encrypted at the client device 104 and decrypted only at the host server 108. Such an embodiment, however, places a significant amount of control over the consumer's data in the hands of the vendor, and thus may not be preferable.

The server-side application may be identified by an application identifier ("APPID"). The APPID may be associated at the host server 108 (e.g., by the DBMS 109) with a particular filtering mechanism. As mentioned, style sheets are well-known and highly suitable filtering tools for use in conjunction with XML data. In response to authenticating the server-side application 107 and identifying the appropriate filter, consumer information may be filtered from the information account 110 and transmitted back to the server-side application 107. The server-side application 107 may then parse the consumer information, for example, in order to auto-populate a form, which may or may not have been previously displayed to the consumer.

As in the case of the client-side application 105, the server-side application 107 may receive decrypted consumer information from the host server 108 via a secure connection, or may receive encrypted consumer information via the open network. Thus, the server-side application 107 may be configured to perform decryption as necessary. The consumer information thus received from the host server 108 may be presented to the consumer for verification. Any modifications or additions made to the consumer information may be submitted back to the server-side application 107 for communication to the host server 108. The DBMS 109 may then update and/or create the information account 110 in the appropriate manner. The consumer may interact with the displayed web page file 116 to submit the consumer information to the vendor server 114. The vendor server 114 may then process the consumer information, as needed, by way of a processing module.

Those skilled in the art will appreciate that the illustration and discussion of exemplary embodiments with reference to FIG. 1 is provided as a generalized example only. Specific details regarding data formats and network communication protocols have been omitted, as such details are well known in the art. Furthermore, the present invention is not intended to be limited to the use of any particular data formats or protocols. Any existing or future formats or protocols may be used without departing from the spirit and scope of the invention. Furthermore, many network components were not shown or discussed with reference to FIG. 1, such as gateways, routers, hubs, switches, firewalls, DNS servers, authentication servers, certificate authorities, and the like.

The functions and roles of such network components are also well known in the art and need not be described in detail herein.

FIG. 2 provides an abstract illustration of an information account 110 in accordance with an exemplary embodiment of the present invention as described herein. In the illustrated embodiment, the consumer information is stored in the information account 110 as a single tagged (delimited) data stream. Those skilled in the art will recognize that XML provides a suitable tagged data format for use in connection with the present invention. However, other tagged data formats can be employed as well. Thus, references to the XML standard in connection with exemplary embodiments of the present invention are not intended to limit the scope of the present invention. The single XML data stream comprises a plurality of consumer information elements 202, each having a unique tag 204 or identifier. A consumer information element 202 may be divided into any number and/or level of sub-elements 206. As is well known in the art, an XML consumer information element 202 may also be associated with one or more attributes 208. An attribute 208 may provide additional information about the content, structure or formatting of a consumer information element 202.

A consumer information element 202 may comprise any type of data or information, including text strings, objects, files, applications, etc. Obviously, the more consumer information that is stored in the information account 110, the larger the XML data stream will be. The size of the XML data stream is limited only by the hardware and software limitations of the system (e.g., memory size, processor speed, bandwidth, etc).

An information account 110 is preferably unique to a single customer. Each information account 110 stored in the data repository 102 may thus comprise a discrete XML data stream. Each information account 110 stored in the data repository 102 may be individually encrypted. For example, one method for encrypting an information account 110 may involve use of the consumer's public key. Accordingly, only someone having access to the consumer's private key will be able to decrypt the consumer's information. Many other and/or additional methods for encrypting information accounts 110 and/or the entire data repository 102 will occur to those skilled in the art.

Although not shown in FIG. 2, those skilled in the art will appreciate that a consumer information element 202 in one information account 110 may comprise a pointer or a reference to another data element or to another information account 110. In one embodiment, a consumer may create, for example, a list of business contacts. A new information account may be created for each individual specified as a business contact by the consumer. Authentication data within the new information account may be set as "anonymous" so that the first consumer may retain access privileges. At some point later, however, the individual named as the business contact may be given control of the new information account by changing the associated authentication information to be unique to that individual. The first consumer may then be granted limited access privileges to continue to access the new information account of the business contact (e.g., by way of a ticket). Alternatively, the first consumer may retain a copy of the business contact information in his own information account.

Figure 3:
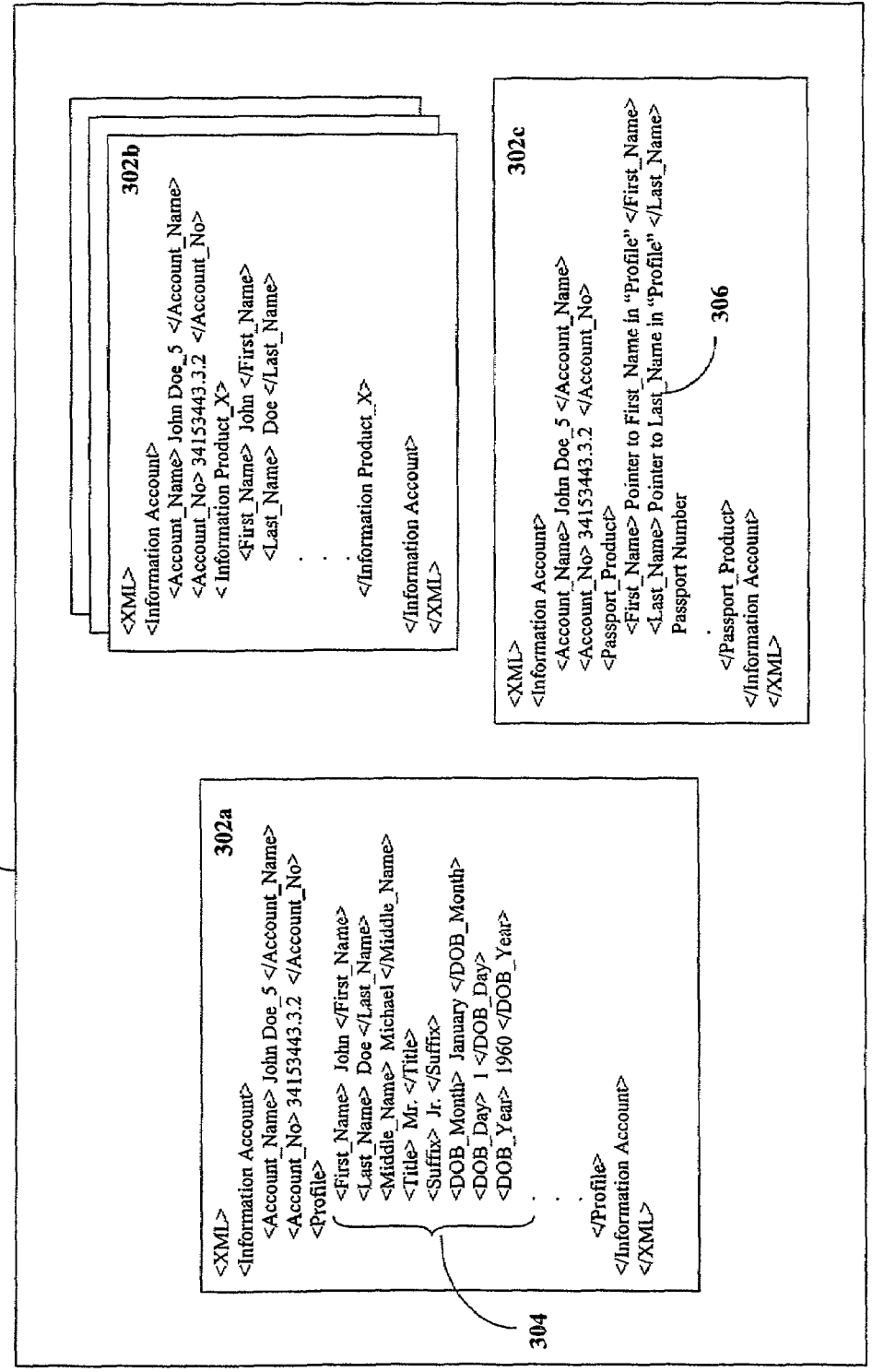
FIG. 3 is an abstract illustration of another information account in accordance with other exemplary embodiments of the present invention as may be used, for example, in the system illustrated in FIG. 1.

FIG. 3 provides an abstract illustration of an information account 110 in accordance with other exemplary embodiments of the present invention. In the embodiment shown, an information account 110 is structured as multiple discrete XML aggregates 302a-c. The discrete XML aggregates 302a-c may comprise one primary "profile" record 302a and one or more information product records 302b-c. The profile record 302a may include a general profile of information elements 304 associated with the consumer. Information product records 302b-c contain consumer information elements that, for example, are specific to a particular product or service offered by a vendor, or that are important to vendors with similar consumer information needs. Aggregation of data elements according to information products allows quick and efficient retrieval of specific consumer information from the information account 110 through a request-response system.

The number of aggregates or records included within the information account 110 of a given consumer depends upon the number of information products for which the consumer has elected to store information. For example, a consumer who has elected to store information about two separate products, such as a car loan and a mortgage loan, would have at least three data aggregates in his information account 110. One such data aggregate would represent the primary profile record and each of the two other data aggregates would include information about one of the information products. Data aggregates may include but are not limited to the following information products: Home Loan, Auto Loan, Student Loan, Home Insurance, Auto Insurance, Life Insurance, Online Banking, Credit Card, Government Services, Education, Career, Travel, Retail, and Relocation. If a consumer creates or updates an information account via a vendor's web site and thereby inputs information regarding a new product, a new product record 302b-c will be created in the information account. Each product record 302b-c created for the consumer is of course associated with the primary profile record 302a.

If an information account 110 is segmented into multiple discrete data aggregates, there may be a need for maintaining consistency among redundant data elements stored in multiple information products. "Latent referential processing" is one method for maintaining data consistency that is contemplated by the present invention. Latent referential processing in this context refers to the use of a series of pointers or references to flag data that is redundant across multiple products. According to latent referential processing, when a record 302a-c is created or updated, redundant information elements that are stored in other data aggregates typically are not also updated until the next time the information account is accessed. For example, if salary information is updated in a home loan information product record, redundant salary information in the consumer's auto loan information product record will generally not be immediately updated. Thus, latent referential processing allows data inconsistencies to exist within the information account after an update.

As is shown and described with reference to FIG. 4, a transaction log may be maintained in the information account to record the date and time of the most recent update for each data record 302a-c. Each time a request is made to access the information account, the DBMS 109 may first examine the transaction log to determine which data element in a set of redundant data elements has most recently been updated. After determining the most recently updated data element, all other redundant data elements are updated to be consistent with the most recently updated data element. Upon completion of the latent referential processing, the request to access the information account may be granted. Accordingly, latent referential processing is a new way of storing and tracking information that addresses the need of providing quick access to information that will be accessed more frequently than it will be updated.

In another embodiment, redundancy and consistency concerns are addressed by normalizing the data aggregates of the information account 110 to the extent possible. For example, an information account 110 may be configured such that the consumer's profile record 302a stores the majority of the consumer's personal information. The profile record 302a may comprise predefined data elements, such as "first name," "middle name," "last name," date of birth," etc. The profile aggregate 302a may also be expanded to include any additional and/or custom fields. Additional aggregates corresponding to information products 302c may contain pointers 306 to the data fields within the profile aggregate 302a. Thus, the information account 110 may be configured to store within one aggregate a single instance of an information element that is referenced by other aggregates. As information product aggregates 302c are formed independently of the profile aggregate 302a, data elements that are not unique to those information product aggregates 302c may be ported into the profile aggregate 302a if desired.

Figure 4:
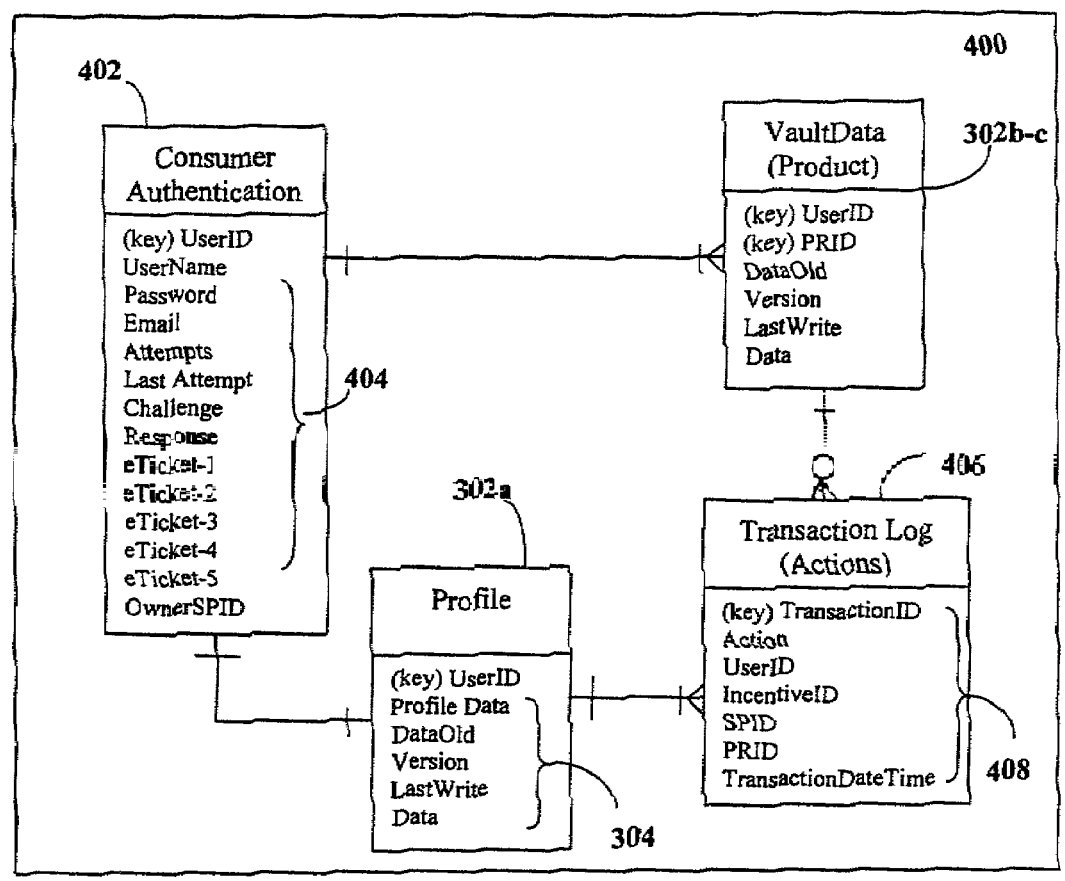
FIG. 4 is an abstract illustration of an exemplary database schema in accordance with certain exemplary embodiments of the present invention.

FIG. 4 illustrates an exemplary database schema 400 in accordance with one or more exemplary embodiments of the present invention as disclosed herein. In particular, the database schema 400 represents the situation where the information account 110 is segmented into multiple discrete data aggregates, as shown in FIG. 3. The database schema 400 may include a consumer authentication record 402 that stores consumer authentication information 404 such as, for example, a user ID, username, password, email address, access attempts, last attempt date/time, challenge word or phrase, challenge response, ticket parameters, and vendor credited with origination of the information account. These and other types of authentication information may be used to authenticate a consumer. The database schema 400 may also include a profile record 302a that stores a primary information profile 304 of the consumer. There will typically be a one to one relationship between the consumer authentication table 402 and the profile record 302a. The exemplary database schema 400 also includes one or more information product records 302b-c that store product-specific information. Each profile record 302a may be associated with one or many information product records 302b-c.

The profile record 302a and each information product record 302b-c may further be associated with a transaction log record 406. Each time the profile record 302a or an information product record 302b-c is acted upon, detailed transaction information 408 may be recorded in a new transaction log record 406. As mentioned above, transaction information 408 may be used for the purpose of maintaining consistency among redundant data elements. Another or additional purpose of the transaction information 408 is to provide the basis for all transaction billing and revenue sharing events. By way of example only, the transaction record 406 may identify the vendor server through which the information account 110 was created. The transaction record 406 may also identify the vendor server through which a transaction was completed using the information account 110. A portion of any monies billed upon completion of a transaction may be shared with each of the vendor servers identified in the transaction record 406.

Figure 5:
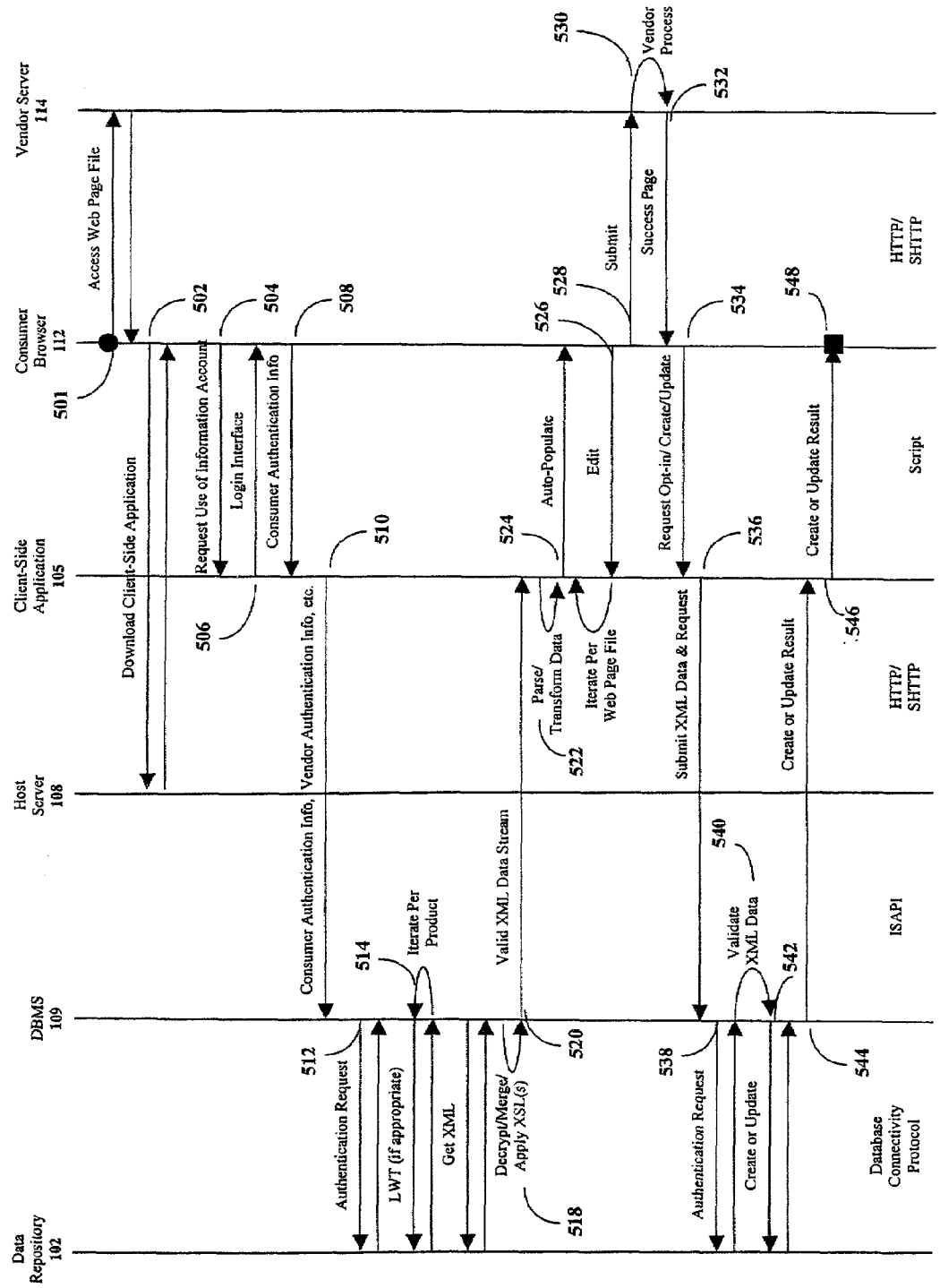
FIG. 5 is a generalized interaction diagram illustrating the interaction between various system components of certain exemplary embodiments of the present invention.

FIG. 5 is a generalized interaction diagram illustrating the interaction between various system components of certain exemplary embodiments of the present invention in connection with consumer-controlled storing, managing and/or distributing information. The exemplary embodiments discussed with reference to FIG. 5 employ a client-side application 105, such as an applet, to manage communication between the client device 104 and the host server 108. Alternative embodiments employing a server-side application 107 instead of the client-side application 105 have been discussed above. Those skilled in the art will appreciate the differences between the interactions involving a client-side application 105 and a server-side application 107.

The generalized interaction diagram begins at step 501, where the consumer operates a browser 112 to retrieve a web page file 116 from the vendor server 114 via the network 106, using a consumer browser. The web page file 116 retrieved from the vendor server 114 may be enabled for interaction with the consumer's information account 110 and may thus include an instruction that causes the browser 112 to download a client-side application from the host server 108. At step 502, the client-side application is downloaded from the host server 108 to the browser 112. At step 504, the consumer interacts with the browser 112 to request use of the information account 110, which in this example has already been created. The web page file 116 may display a selectable icon or other indicia that allows the consumer to request use of the information account 110. Alternatively, the client-side application 105 may provide the interface for requesting use of the information account 110.

Next at step 506, the client-side application 105 displays a login interface to the consumer. The login interface may be displayed, for example, in the open display window of the browser 112, in a pop-up window, or in any other suitable manner. At step 508 the consumer inputs consumer authentication information, which is transferred from the browser to the client-side application 105. Consumer authentication information may comprise, for example, a username, user ID, password, challenge phrase, email address, etc. At step 510, the user authentication information is combined with vendor authentication information and is sent to the DBMS 109. Vendor authentication information may comprise a vendor ID, password, product IP, application ID, and the like. Vendor authentication information may be used to authenticate the vendor and to determine the manner in which consumer information is to be filtered from the information account 110.

After the DBMS 109 receives the authentication information, it submits an authentication request to the data repository 102 at step 512. The authentication request may be a database query to determine if the supplied consumer authentication information and vendor authentication information are consistent with previously stored authentication information. In response to authenticating the consumer and the vendor, the DBMS 109 performs one or more database queries at step 514 to retrieve consumer information elements from the information account 110. Depending on the structure of the information account, the DBMS 109 may retrieve certain products (identified by product ID) from the information account 110, or may retrieve a set of data elements filtered according to a vendor ID or an application ID. If consumer information is retrieved according to products, an iterative lightweight transfer ("LWT") process may be performed in order to get the best set of data elements for each new product ID. Lightweight transfer techniques are well-known in the art and generally involve the use of thin protocols and/or smart proxies that can cache results and perform buffered reads and writes, minimizing the number of network calls.

Once the DBMS 109 has retrieved the relevant consumer information, the consumer information elements may be merged (if appropriate) decrypted (if appropriate) and/or further filtered (if appropriate) at step 518. Then, at step 520, the resulting information elements are transmitted to the client-side application 105, for example in the form of an XML data stream. At step 522, the client-side application 105 parses the received XML data and transforms it into the required format for populating the input fields of the displayed web page file 116. The client-side application 105 then auto-populates the input fields of the displayed web-page file 116 at step 524. The consumer may interact with the browser 112 to edit or modify the auto-populated information at step 526. Because there may be multiple web page files 116 associated with the vendor website, steps 524 and 526 are repeated until all data has been auto-populated and/or edited on every included web page. The client-side application 105 monitors the edit process to determine if the consumer desires to modify and/or supplement any of the consumer information elements.

The consumer may then interact with the browser 112 at step 528 in order to submit the consumer information that has been entered into the displayed web page file(s) 116 to the vendor server 114. The vendor server 114 receives and processes the consumer information elements at step 530. After processing the consumer information, the vendor server 114 preferably transmits a "success page" or other acknowledgement to the consumer's browser 112 at step 532.

Either through a selectable icon or other indicia displayed on the success page or displayed by the client-side application 105, or any other interactive means, the consumer may interact with the browser 112 at step 534 to submit an update request to the DBMS 109. Update is an event whereby the information account 110 is updated to reflect any edits that the consumer may have made to the consumer information at step 526. Thus, the present invention allows the consumer to update the information account 110 via a vendor's website. As another option, the consumer may elect to update the information account 110 at a later time directly via the host server 108.

At step 536 the client-side application submits the consumer's XML data (possibly only the edited data) and the update request to the DBMS 109. Then at step 538 the update request is submitted to the data repository for authentication. In the authentication process, consumer authentication information, vendor authentication information and, if appropriate, product identification information (which are all included in the update request) are verified. Upon authentication of the update request, the XML data is validated at step 540 and the update is performed at step 542. The DBMS then sends the update result (success or failure) to the client-side application 105 at step 544, which in turn displays the update result to the browser 112 at step 546. The exemplary generalized interaction diagram then ends at step 548.

Figure 6:
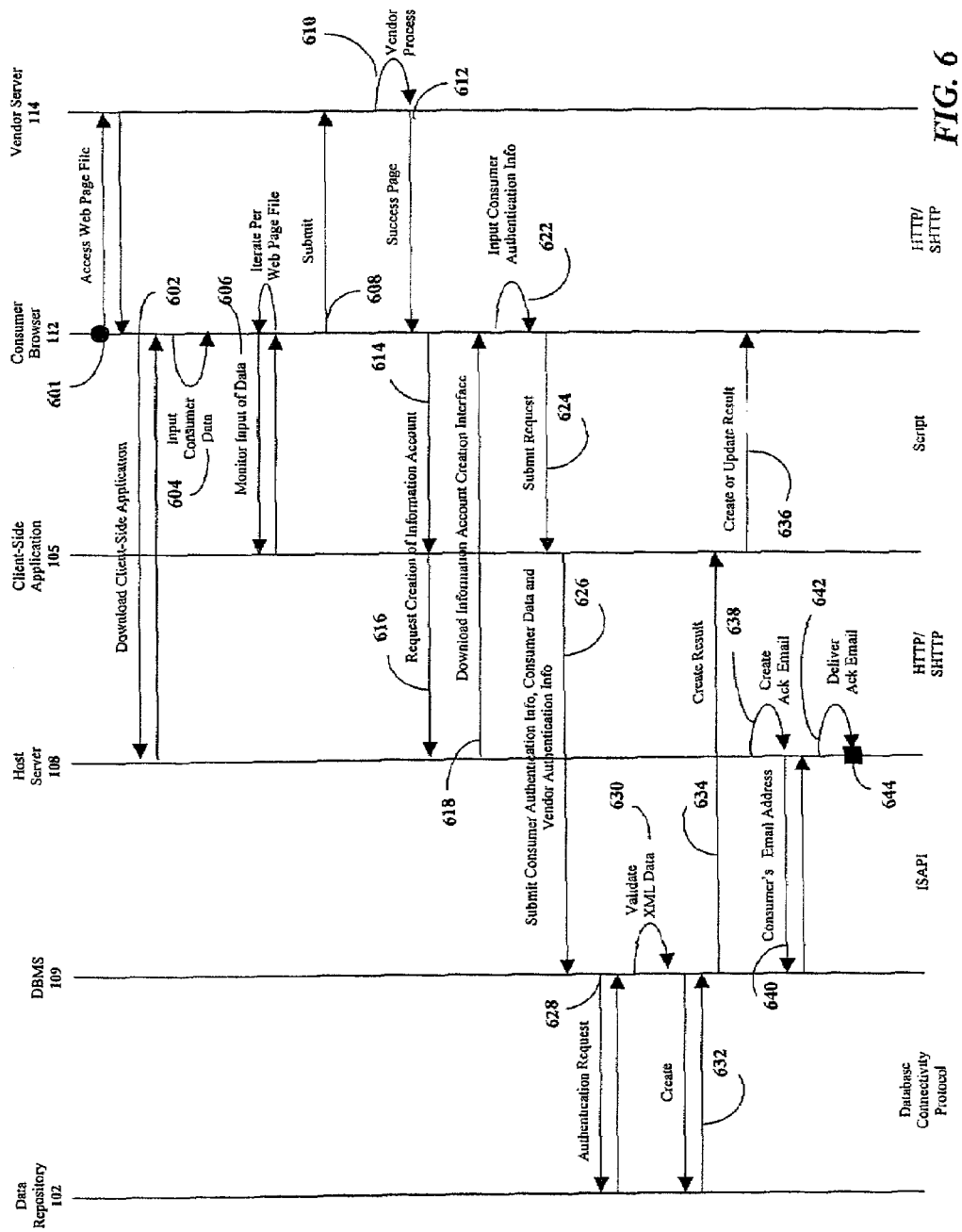
FIG. 6 is a generalized interaction diagram illustrating the interaction between various system components when a new information account is created by a consumer via a vendor's website, in accordance with one or more exemplary embodiments of the present invention.

FIG. 6 is a generalized interaction diagram illustrating the interaction between main system components when a new information account is created by a consumer via a vendor's website. As mentioned, the consumer may create an information account by visiting a vendor's website that has been configured to interact with the system of the present invention according to the techniques described herein. The vendor's website may, for example, require the user to manually input consumer information into the input fields of a form. The user may then direct that an information account be created to store the consumer information, so that the consumer will not be required to manually enter the consumer information again on any participating website.

The exemplary embodiments discussed with reference to FIG. 6 employ a client-side application 105, such as an applet, to manage communication between the client device 104 and the host server 108. Alternative embodiments employing a server-side application 107 instead of the client-side application 105 have been discussed above. Those skilled in the art will appreciate the differences between the interactions involving a client-side application 105 and a server-side application 107.

The exemplary interaction diagram of FIG. 6 begins at step 601, where the consumer operates a browser 112 to retrieve a web page file 116 from the vendor server 114 via the network 106, using a consumer browser. The web page file 116 retrieved from the vendor server 114 may be enabled for interaction with the consumer's information account 110 and may thus include an instruction that causes the browser 112 to download a client-side application from the host server 108. At step 602, the client-side application is downloaded from the host server 108 to the browser 112. At step 604, the consumer interacts with the browser 112 to input consumer information into the input fields of the vendor's website. The client-side application 105 monitors the input of consumer information at step 606.

Next at step 608 the consumer interacts with the browser 112 in order to submit the consumer information to the vendor server 114. The vendor server 114 receives and processes the consumer information elements at step 610. After processing the consumer information, the vendor server 114 transmits a "success page" or other acknowledgement to the consumer's browser 112 at step 612. Either through a selectable icon or other indicia displayed on the success page or displayed by the client-side application 105, the consumer may interact with the browser 112 at step 614 to submit a request for creation of an information account 110 to the DBMS 109. Thus, the present invention allows the consumer to create an information account 110 via a vendor's website. As another option, the consumer may elect to create an information account 110 at a later time directly via the host server 108.

At step 616 the client-side application submits the consumer's XML data and the create request to the host server 108. Then at step 618 the host server 108 transmits an information account creation interface to the browser 112. The consumer inputs consumer authentication information via the information account creation interface at step 622 and the browser 112 passes the create request (which may include the consumer authentication information, the vendor authentication information, etc.) to the client-side application 105 at step 624.

At step 626, the create request is combined with the consumer's XML data and is sent to the DBMS 109. In response to receiving the authentication information, the DBMS 109 submits an authentication request to the data repository 102 at step 628. The authentication request may be a database query to determine if the supplied consumer authentication information and vendor authentication information are consistent with previously stored authentication information. In response to authenticating the consumer and the vendor, the DBMS 109 validates the consumer's XML data at step 630 and creates a new information account 110 at step 632.

Once the information account has been created, the DBMS 109 sends the create result (success or failure) to the client-side application 105 at step 634, which in turn displays the create result to the browser 112 at step 636. At step 638, the host server 108 creates an acknowledgment email to be sent to the consumer's email account. At step 640, the host server requests and receives the consumer's email address from the DBMS 109. At step 642 the consumer's acknowledgment email is delivered to the consumer. The exemplary generalized interaction diagram then ends at step 644.

Figure 7:
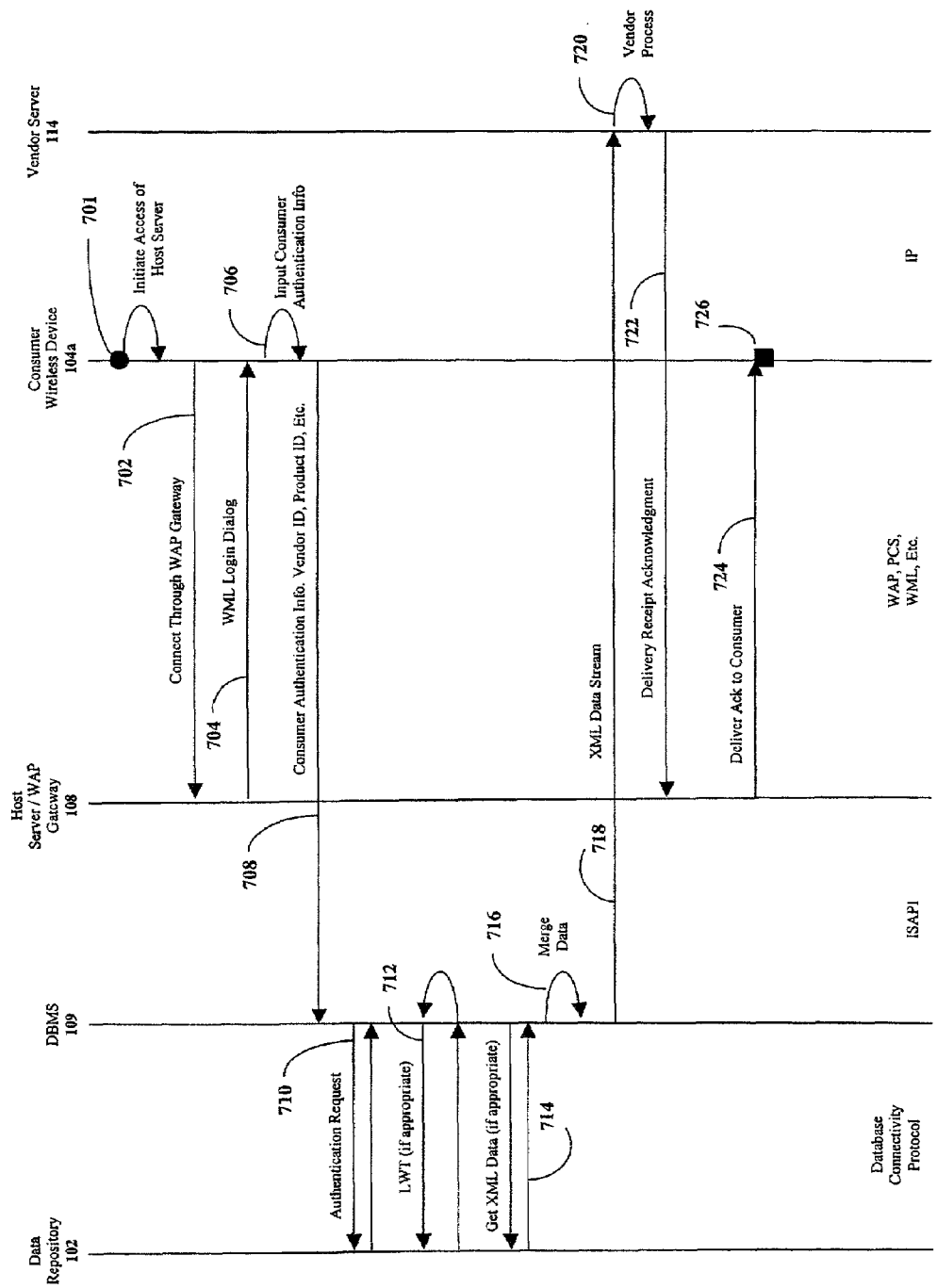
FIG. 7 is a generalized interaction diagram illustrating the interaction between various system components in an exemplary wireless environment.

FIG. 7. is a generalized interaction diagram illustrating the interaction between various system components in an exemplary wireless environment suitable for implementation of the present invention in connection with consumer-controlled storage, management and/or distribution of information. An exemplary wireless environment is suited for wireless devices such as digital or cellular telephones, personal digital assistants (PDAs), portable computers, and the like. Such wireless devices generally include a display device and an input device (keypad, touch screen, microphone, etc.), each of limited size and utility. The difficulty of inputting detailed information and commands into a wireless device makes it desirable to provide a system whereby the backend DBMS 109 is able to communicate directly with various remote web servers, thus eliminating a significant amount of user-interaction with the wireless device.

The generalized interaction diagram of FIG. 7 begins at step 701, where the consumer operates a wireless client device 104*a* to access the host server 108. Accessing the host server 108 may involve, for example, calling a dedicated access number using a mobile telephone device or two-way pager. At step 702, the wireless client device 104*a* accesses the host server 108 via a wireless application ("WAP") gateway. At step 704, the host server 108 returns a login interface to the wireless client device 104*a*. At step 706 the consumer inputs consumer authentication information using an input device of the wireless client device 104*a*. Consumer authentication information may comprise, for example, a username, user ID, password, challenge phrase, email address, etc.

At step 708, the user authentication information is combined with vendor authentication and is sent to the DBMS 109. Vendor authentication information may comprise a vendor ID, password, product IP, application ID, and the like. Vendor authentication information may be used to authenticate the vendor and to determine the manner in which consumer information is to be filtered from the information account 110. After the DBMS 109 receives the authentication information, it submits an authentication request to the data repository 102 at step 710. In response to authenticating the consumer and the vendor, the DBMS 109 performs one or more database queries to retrieve consumer information elements from the information account 110. Depending on the structure of the information account, the DBMS 109 may retrieve certain products (identified by product ID) from the information account 110, or may retrieve a set of data elements filtered according to a vendor ID or an application ID. If consumer information is retrieved according to products, an iterative lightweight transfer ("LWT") process may be performed at step 712 in order to get the best set of data elements for each new product ID. Otherwise, the consumer information elements are retrieved from the data repository 102 using appropriate filters at step 714.

Once the DBMS 109 has retrieved the relevant consumer information, the consumer information elements may be merged (if appropriate), decrypted (if appropriate) and/or further filtered (if appropriate) at step 716. Then, at step 718, the resulting information elements are transmitted to the vendor server 114, for example, in the form of an XML data stream. The vendor server 114 receives and processes the consumer information elements at step 720. After processing the consumer information, the vendor server 114 transmits a delivery receipt acknowledgment to the host server 108 at step 722. The host server 108 may then pass an acknowledgment (success or failure) to the consumer (e.g., to the wireless client device 104*a* or to another client device 104) at step 724. The exemplary generalized interaction diagram then ends at step 726.

From a reading of the description above pertaining to the disclosed embodiments of the present invention, many other modifications, features, embodiments and operating environments of the present invention will become evident to those of skill in the art. It should be appreciated that many features and aspects of the present invention were described above by way of example only and are therefore not intended to be interpreted as required or essential elements of the invention. It should be understood, therefore, that the foregoing relates only to certain exemplary embodiments of the invention, and that numerous changes and additions may be made thereto without departing from the spirit and scope of the invention as defined by any appended claims.

We claim:

1. A computer-implemented method for storing, managing and distributing consumer information via a distributed electronic network, the method comprising the steps of:

storing an information account in a central data repository accessible via the distributed electronic network, the information account comprising a plurality of consumer information elements associated with a consumer and being subject to the consumer's control and management;

receiving with a database management system, a request over the distributed electronic network from a network device for one or more selected consumer information elements, the request including consumer authentication information and being made by the network device responsive to an input command supplied by the consumer;

in response to the request, authenticating the consumer based on the authentication information, retrieving the selected consumer information elements from the information account by filtering data from the information account with the database management system, and transmitting the selected consumer information elements, over the distributed electronic network, to the network device; and autopopulating the selected consumer information elements into at least one input field of a web page file.

2. The method of claim 1, wherein the request is made while the consumer accesses a first web page file; and wherein the method further comprises the step of invoking, in response to successful authentication of the consumer, a single sign-on mechanism so that the consumer will not be required to resubmit the consumer authentication information, prior to occurrence of a terminating event, upon accessing a subsequent web page file and requesting additional selected consumer information elements.

3. The method of claim 2, wherein said terminating event comprises expiration of a time-out period.

4. The method of claim 1, wherein the network device comprises a client device executing a browser, and wherein the method further comprises the step oft prior to receiving the request from the network device for the selected consumer information elements, transmitting to the network device a temporary client-side application configured to manage the request/response process for the network device.

5. The method of claim 4, wherein the browser displays a web page file that has been retrieved from a vendor server, the web page file including an instruction that causes the browser to request transmission of the client-side application.

6. The method of claim 4, wherein the client-side application executes a communication protocol for communicating with the database management system that manages the central data repository.

7. The method of claim 4, wherein the client-side application receives the selected consumer information elements and integrates the selected consumer information elements into a vendor's business process on behalf of the consumer.

8. The method of claim 7, wherein the step of integrating the selected consumer information elements into a vendor's business process further comprises the step of:
   allowing the consumer to interact with the browser in order to submit the web page file that has been auto-populated with the selected consumer information elements to the vendor server for processing of the selected consumer information elements.

9. The method of claim 8, wherein the consumer edits at least one of the auto-populated selected consumer information elements before submitting the web page file to the vendor server
   wherein the client-side application detects that the at least one auto-populated selected consumer information elements has been edited; and
   wherein the client-side application transmits the at least one edited auto-populated selected consumer information elements to the information account for updating of the information account.

10. The method of claim 8, wherein the consumer inputs at least one additional consumer information element before submitting the web page file to the vendor server;
   wherein the client-side application detects that the at least one additional consumer information element has been input; and
   wherein the client-side application transmits the at least one additional consumer information element to the information account for storage.

11. The method of claim 4, wherein the selected consumer information elements are transmitted to the network device in an encrypted format; and
   wherein the client-side application decrypts the selected consumer information elements.

12. The method of claim 4, wherein the selected consumer information elements are transmitted to the client-side application in a decrypted format via a secure network connection.

13. The method of claim 1, wherein the network device comprises a vendor server interacting with a client device, the vendor server executing a server-side application for interacting with the database management system that manages the central data repository.

14. The method of claim 13, wherein the selected consumer information elements are transmitted to the network device in an encrypted format; and
   wherein the server-side application decrypts the selected consumer information elements.

15. The method of claim 13, wherein the selected consumer information elements are transmitted to the server-side application in a decrypted format via a secure network connection.

16. The method of claim 13, wherein the server-side application receives the selected consumer information elements from the database management system and integrates the selected consumer information elements into a vendor's business process on behalf of the consumer.

17. The method of claim 16, wherein integrating the selected consumer information elements into the vendor's business process comprises:
   transmitting the auto-populated web page file to the browser for display to the consumer; and
   in response to a submit command received from the browser, passing the selected consumer information elements to a processing module executed by the vendor server.

18. The method of claim 17, wherein the consumer edits at least one of the auto-populated selected consumer information elements before issuing the submit command;
   wherein the server-side application detects that the at least one auto-populated selected consumer information elements has been edited; and
   wherein the server-side application transmits the at least one edited auto-populated selected consumer information elements to the information account for updating of the information account.

19. The method of claim 17, wherein the consumer inputs at least one additional consumer information element before issuing the submit command;
   wherein the server-side application detects that the at least one additional consumer information element has been input; and
   wherein the server-side application transmits the at least one additional consumer information element to the information account for storage.

20. The method of claim 1, wherein the consumer information elements are stored in the central data repository in a tagged data format.

21. The method of claim 20, wherein retrieving the selected consumer information elements from the information account comprising filtering the consumer information elements of the information account using at least one style sheet.

22. The method of claim 1, further comprising:
   in response to transmitting the selected consumer information elements to the network device, receiving an acknowledgment from the network device indicating that the selected consumer information elements were used to complete a transaction, the acknowledgment including transaction information; and
   storing the transaction information in a transaction log.

23. The method of claim 22, wherein the transaction log identifies a vendor who completed the transaction and a vendor who facilitated creation of the information account; and wherein any revenue received in relation to the transaction may be shared with the vendor who completed the transaction and the vendor who facilitated creation of the information account.

24. A computer memory having stored thereon computer-executable instructions for storing, managing and distributing consumer information via a distributed network, by causing one or more processors to perform the steps of:
   storing an information account in a central data repository accessible via the distributed electronic network, the information account comprising a plurality of consumer information elements associated with a consumer and being subject to the consumer's control and management;
   receiving with a database management system, a request over the distributed network from a network device for one or more selected consumer information elements, the request including consumer authentication information and being made by the network device responsive to an input command supplied by the consumer;

in response to the request, authenticating the consumer based on the authentication information, retrieving the selected consumer information elements from the information account by filtering data from the information account with the database management system, and transmitting the selected consumer information elements, over the distributed electronic network, to the network device; and autopopulating the selected consumer information elements into at least one input field of a web page file.

25. The computer memory of claim 24, wherein the network device comprises a client device executing a browser, and wherein said computer-executable instructions further cause the one or more processors to perform the step of, prior to receiving the request from the network device for the selected consumer information elements, transmitting to the network device a temporary client-side application configured to manage the request/response process for the network device.

26. The computer memory of claim 25, wherein said computer instructions further cause the one or more processors to perform the step of causing the browser displays a web page file that has been retrieved from a vendor server, the web page file including an instruction that causes the browser to request transmission of the client-side application.

27. The computer memory of claim 25, wherein said computer executable instructions further cause the one or more processors to perform the step of causing the client-side application to receive the selected consumer information elements and integrate the selected consumer information elements into a vendor's business process on behalf of the consumer.

28. The computer memory of claim 27, wherein said computer-executable instructions which cause the one or more processors to perform the step of integrating the selected consumer information elements into the vendor's business process further comprise computer-executable instructions which cause the one or more processors to perform the step of:

allowing the consumer to interact with the browser in order to submit the web page file that has been auto-populated with the selected consumer information elements to the vendor server for processing of the selected consumer information elements.

29. The computer memory of claim 28, wherein said computer-executable instructions further cause the one or more processors to perform the step of:

allowing the consumer to edit at least one of the auto-populated selected consumer information elements before submitting the web-page file to the vendor server;

causing the client-side application to detect that the at least one auto-populated selected consumer information elements has been edited; and causing the client-side application to transmit the at least one edited auto-populated selected consumer information elements to the information account for updating of the information account.

30. The computer memory of claim 28, wherein said computer-executable instructions further cause the one or more processors to perform the step of:

allowing the consumer to input at least one additional consumer information element before submitting the web page file to the vendor server;

causing the client-side application to detect that the at least one additional consumer information element has been input; and causing the client-side application to transmit the at least one additional consumer information element to the information account for storage.

31. The computer memory of claim 28, wherein the network device comprises a vendor server interacting with a client device, and wherein said computer-executable instructions further cause the one or more processors to perform the step of causing the vendor server to execute a server-side application for interacting with a database management system that manages the central data repository.

32. The computer memory of claim 31, wherein said computer-executable instructions further cause the one or more processors to perform the step of causing the server-side application to receive the selected consumer information elements from the database management system and to integrate the selected consumer information elements into a vendor's business on behalf of the consumer.

33. The computer memory of claim 32, wherein said computer-executable instructions which cause one or more processors to perform the step of integrating the selected consumer information elements into the vendor's business process further comprise computer-executable instructions which cause the one or more processors to perform the steps of:

transmitting the auto-populated web page file to the browser for display to the consumer; and in response to a submit command received from the browser, passing the selected consumer information elements to a processing module executed by the vendor server.

34. The computer memory of claim 33, wherein said computer-executable instructions cause one or more processors to perform the step of:

allowing the consumer to edit at least one of the auto-populated selected consumer information elements before issuing the submit command;

causing the server-side application to detect that the at least one auto-populated selected consumer information elements has been edited; and causing the server-side application to transmit the at least one edited auto-populated selected consumer information elements to the information account for updating of the information account.

35. The computer memory of claim 33, wherein said computer-executable instructions cause one or more processors to perform the step of:

allowing the consumer to input at least one additional consumer information element before issuing the submit command;

causing the server-side application to detect that the at least one additional consumer information element has been input; and causing the server-side application to transmit the at least one additional consumer information element to the information account for storage.

36. A computer-implemented method for storing, managing and distributing consumer information via a distributed electronic network, the method comprising the steps of:

hosting a web page file accessible via the distributed electronic network by a client device executing a browser, the web page file prompting a consumer to input selected consumer information elements; and executing a server-side application configured for communication with a host server that hosts a central data repository, the server-side application operable to:

determine the selected consumer information elements that are to be input into the web page file by the consumer, transmit a request to the host server for retrieval of the selected consumer information elements from an information account associated with the consumer, retrieving the selected consumer information elements by filtering data from the information account with a database management system, in response to receiving the selected consumer information elements from the host server, passing the selected consumer information elements to a processing module for processing, and autopopulating the selected information elements into at least one input field of a web pare file.

37. The computer memory having stored thereon computer-executable instructions for performing the method of claim 36.

38. The method of claim 36, further comprising, prior to passing the selected consumer information elements to the processing module, displaying the autopopulated web page file to the consumer via the browser; and receiving a submit command from the browser indicating the consumer's desire to pass the selected consumer information elements to the processing module for processing.

39. The method of claim 38, wherein the consumer edits at least one of the auto-populated consumer information elements;

wherein the server-side application detects that the at least one auto-populated consumer information elements has been edited; and wherein, in response to the update command issued by the consumer, the server-side application transmits the at least one edited auto-populated consumer information elements to the host server for updating of the information account.

40. A computer-readable medium having stored thereon computer-executable instructions for performing the method of claim 39.

41. The method of claim 36, wherein the server-side application causes a login interface to be displayed to the consumer via the browser for the input of consumer authentication information; and wherein the server-side application detects the input of the consumer authentication information and transits the consumer authentication information to the host server for authentication of the consumer prior to receiving the selected consumer information elements from the host server.

42. A computer-readable medium having stored thereon computer-executable instructions for performing the method of claim 41.

43. The method of claim 41, further comprising, in response to authenticating the consumer, invoking a single sign-on mechanism so that the consumer will not be required to resubmit the consumer authentication information upon accessing a subsequent web page file prior to expiration of a timeout period.

44. A computer-readable medium having stored thereon computer-executable instructions for performing the method of claim 43.

45. The method of claim 41, wherein the server-side application receives vendor authentication information from a vendor server on which it is executed; and wherein the server-side application transmits the vendor authentication information to the host server for authentication of the vendor prior to receiving the selected consumer information elements from the host server.

46. The method of claim 36, wherein the selected consumer information elements are transmitted to the server-side application in an encrypted format; and wherein the server-side application decrypts the selected consumer information elements.

47. The method of claim 36, wherein the selected consumer information elements are transmitted to the server-side application in a decrypted format via a secure network connection.

48. The method of claim 36, wherein the consumer information elements are stored in the central data repository in a tagged data format.

49. The method of claim 36, wherein processing the selected consumer information elements comprises using the selected consumer information elements to complete a transaction; and wherein the method further comprises transmitting transaction information to the host server for storage in a transaction log.

50. A computer-implemented method for storing, managing and distributing consumer information via a distributed electronic network comprising:

executing a browser for accessing a web page data file hosted by a vendor sewer, the web page file including an instruction that causes the browser to download a temporary client-side application from a host server that hosts a central data repository storing an information account; and executing the client-side application in order to:

determine a plurality of selected consumer information elements that are to be input into input fields of the web page file, transmit a request to the host server for retrieval of the selected consumer information elements from the information account, retrieving the selected consumer information elements by filtering data from the information account with a database management system; and in response to receiving the selected consumer information elements from the host server, auto-populating the selected consumer information elements into the input fields of the web page file.

51. The method of claim 50, wherein the client-side application displays a login interface for the input of consumer authentication information; and wherein the client-side application transmits the consumer authentication information to the host server for authentication of the consumer prior to receiving the selected consumer information elements from the host server.

52. The method of claim 51, wherein the client-side application receives vendor authentication information from the vendor server; and wherein the client-side application transmits the vendor authentication information to the host sewer for authentication of the vendor prior to receiving the selected consumer information elements from the host server.

53. The method of claim 50, wherein the selected consumer information elements are transmitted to the client-side application in an encrypted format; and wherein the client-side application decrypts the selected consumer information elements.

54. The method of claim 50, wherein the selected consumer information elements are transmitted to the client-side application in a decrypted format via a secure network connection.

55. The method of claim 50, wherein the consumer edits at least one of the auto-populated consumer information elements;

wherein the client-side application detects that the at least one auto-populated consumer information elements has been edited; and wherein, in response to an update command issued by the consumer, the client-side application transmits the at least one edited auto-populated consumer information elements to the host server for updating of the information account.

56. A computer-readable medium having stored thereon computer-executable instructions for performing the method of claim 55.

57. The method of claim 50, wherein the consumer information elements are stored in the central data repository in a tagged data format.

58. A system for storing, managing and distributing consumer information via a distributed electronic network, comprising:

a central data repository accessible via the distributed electronic network for storing an information account, the information account comprising a plurality of consumer information elements associated with a consumer and subject to the consumer's control and management; and a host server for communicating with the central database and with a network device via the distributed electronic network and for executing computer-executable instructions for:

in response to receiving a request from the network device for selected consumer information elements, communicating with the central data repository in order to retrieve the selected consumer information elements from the information account by filtering data from the information account with a database management system, and transmitting the selected consumer information elements to the network device over the distributed electronic network; and autopopulating the selected consumer information elements into at least one input field of a web page file.

59. The system of claim 58, wherein the request includes consumer authentication information; and wherein the host server executes further computer-executable instructions for communicating with the central data repository to authenticate the consumer based on the authentication information, prior to retrieving the selected consumer information elements from the information account.

60. The system of claim 58, wherein the network device comprises a client device executing a browser;

wherein the host server further comprises a memory for storing a client-side application configured to manage communications with the host server on behalf of the client device; and wherein the host server executes further computer-executable instructions for transmitting to the client device the client-side application, prior to receiving the request from the network device for the selected consumer information elements.

61. The system of claim 60, wherein the browser displays a web page file that has been retrieved from a vendor server, the web page file including an instruction that causes the browser to request transmission of the client-side application from the host server.

62. The system of claim 61, wherein the client-side application receives the selected consumer information elements from the host server and performs the autopopulating.

63. The system of claim 61, wherein the consumer interacts with the browser in order to submit the web page file that has been auto-populated with the selected consumer information elements to the vendor server for processing of the selected consumer information elements.

64. The system of claim 63, wherein the consumer edits at least one of the auto-populated selected consumer information elements before submitting the web-page file to the vendor server;

wherein the client-side application detects that the at least one auto-populated selected consumer information elements has been edited; and wherein the client-side application transmits the at least one edited auto-populated selected consumer information elements to the host server for updating of the information account.

65. The system of claim 63, wherein the consumer inputs at least one additional consumer information element before submitting the web-page file to the vendor server;

wherein the client-side application detects that the at least one additional consumer information element has been input; and wherein the client-side application transmits the at least one additional consumer information element to the host server for storage in the information account.

66. The system of claim 60, wherein the selected consumer information elements are transmitted to the client-side application in an encrypted format; and wherein the client-side application decrypts the selected consumer information elements.

67. The system of claim 60, wherein the selected consumer information elements are transmitted to the client-side application in a decrypted format via a secure network connection.

68. The system claim 58, wherein the network device comprises a vendor server interacting with a client device, the vendor server executing a server-side application for communicating with the host server.

69. The system of claim 68, wherein the selected consumer information elements are transmitted to the vendor server device in an encrypted format; and wherein the server-side application decrypts the selected consumer information elements.

70. The system of claim 68, wherein the selected consumer information elements are transmitted to the server-side application in a decrypted format via a secure network connection.

71. The system of claim 68, wherein the server-side application receives the selected consumer information elements from the host server and performs the autopopulating integrates the selected consumer information elements into a vendor's business process on behalf of the consumer.

72. The system of claim 71, wherein integrating the selected consumer information elements into the vendor's business process comprises:

transmitting the auto-populated web page file to the browser for display to the consumer; and in response to a submit command received from the browser, passing the selected consumer information elements to a processing module executed by the vendor server.

73. The system of claim 72, wherein the consumer edits at least one of the auto-populated selected consumer information elements before issuing the submit command;

wherein the server-side application detects that the at least one auto-populated selected consumer information elements has been edited; and wherein the server-side application transmits the at least one edited auto-populated selected consumer information elements to the host sewer for updating of the information account.

74. The system of claim 72, wherein the consumer inputs at least one additional consumer information element before issuing the submit command;

wherein the server-side application detects that the at least one additional consumer information element has been input; and wherein the server-side application transmits the at least one additional consumer information element to the host sewer for storage in the information account.

75. The system of claim 58, wherein the consumer information elements are stored in the central data repository in a tagged data format.

76. The system of claim 75, wherein retrieving the selected consumer information elements from the information account comprises filtering the consumer information elements of the information account using at least one style sheet.

77. The system of claim 58, wherein the host sewer further executes computer-executable instructions for:

in response to transmitting the selected consumer information elements to the network device, receiving an acknowledgment from the network device indicating that the selected consumer information elements were used to complete a transaction, the acknowledgment including transaction information; and storing the transaction information in a transaction log associated with the information account in the central data repository.

78. A system for storing, managing and distributing consumer information comprising:

a means for centrally storing an information account comprising a plurality of tagged consumer information elements associated with a consumer;

means for hosting a database management system configured to create, update or delete the consumer information elements;

means for managing communications between the database management system and a network device across a distributed electronic network, said means being configured to request selected consumer information elements from the database management system, receive the selected consumer information elements from the database management system which filters an information account to obtain the consumer information elements, and transmit the selected consumer information elements across the distributed electronic network for use by the network device; and means for autopopulating the selected consumer information elements into at least one input field of a web page.

79. The system of claim 78, wherein the means for managing communications between the database management system and the network device is configured to submit consumer authentication information along with the request for selected consumer information elements; and wherein the database management system is further configured to access the information account to authenticate the consumer based on the authentication information.

80. The system of claim 78, wherein the network device comprises a client device executing a browser.

81. The system claim 78, wherein the network device comprises a vendor server interacting with a client device.

82. A computer-implemented method for storing, managing and distributing user information via a distributed electronic network, the method comprising the steps of:

storing a user personal information account within a central data repository accessible via the distributed electronic network, the user personal information account comprising a plurality of information elements relating to a user;

receiving, via the distributed electronic network, a first request from a first network device for selected information elements in the user personal information account for use by a first client-side application program, the first request being made by the first network device responsive to a first input command supplied by the user;

in response to the first request, retrieving the selected information elements from the user personal information account by filtering data from the user personal information account with a database management system and transmitting the selected information elements, via the distributed electronic network, to the first network device;

autopopulating the selected consumer information elements into at least one input field of a first web page file;

receiving, via the distributed electronic network, a second request from a second network device for selected information elements in the user personal information account for use by a second client-side application program, the second request being made by the second network device responsive to a second input command supplied by the user;

in response to the second request, retrieving the selected consumer information elements from the user personal information account by filtering data from the user personal information account with a database management system and transmitting the selected consumer information elements, via the distributed electronic network, to the second network device; and autopopulating the selected consumer information elements into at least one input field of a second web page file.

83. The method of claim 82, wherein at least one of the first request and second request for selected information elements in the user personal information account includes user authentication information; and wherein the method further comprising, prior to retrieving the selected information elements from the user personal information account, the step of authenticating the user based on the authentication information.

84. A computer-implemented method for storing, managing and distributing user information via a distributed electronic network, the method comprising the steps of:

storing a user personal information account within a central data repository accessible via the distributed electronic network, the user personal information account comprising a plurality of information elements relating to a user;

transmitting to a network device, over the distributed electronic network, a web page file from a provider web site;

transmitting to the network device, over the distributed electronic network, a client-side application program, the client-side application program being transmitted in response to a request from the network device resulting from execution at the network device of an instruction within the web page file;

receiving from the network device, over the distributed electronic network, a request for selected information elements in the user personal information account, the request being made by the network device under control of the client-side application program;

in response to the request, retrieving the selected information elements from the user personal information account by filtering data from the user personal information account with a database management system and transmitting the selected information elements, over the distributed electronic network, to the network device; and autopopulating the selected consumer information elements into at least one input field of the web page file.

85. The method of claim 84, further comprising the steps of:

transmitting to the network device, over the distributed electronic network, a second web page file from a second provider web site;

transmitting to the network device, over the distributed electronic network, a second client-side application program, the second client-side application program being transmitted in response to a request from the network device resulting from execution at the network device of an instruction within the second web page file;

receiving from the network device, over the distributed electronic network, a second request for selected information elements in the user personal information account, the second request being made by the network device under control of the second client-side application program;

in response to the second request, retrieving the selected information elements from the user personal information account by filtering data from the user personal information account with a database management system and transmitting the selected information elements, over the distributed electronic network, to the network device; and autopopulating the selected consumer information elements into at least one input field of the second web page file.

86. The method of claim 84, further comprising the step of receiving, at the provider web site and over the distributed electronic network, an electronic form from the network device, said electronic form comprising one or more of the selected information elements embedded therein by the client-side application program.

87. The method of claim 84, wherein the request for selected information elements in the user personal information account includes user authentication information; and wherein the method further comprising, prior to retrieving the selected information elements from the user personal information account, the step of authenticating the user based on the authentication information.

88. A computer-implemented method for storing, managing and distributing consumer information via a distributed electronic network, the method comprising the steps of:

storing an information account in a central data repository accessible via the distributed electronic network, the information account comprising a plurality of tagged consumer information elements associated with a consumer and being subject to the consumer's control and management;

receiving, over the distributed electronic network, a plurality of requests from a network device for different combinations of selected consumer information elements;

in response each of the requests, retrieving the selected consumer information elements from the information account by filtering data from the information account with a database management system and transmitting the selected consumer information elements, as tagged data streams, to the network device over the distributed electronic network; and autopopulating the selected consumer information elements into at least one input field of a web page.

89. The method of claim 88, wherein said requests are made by the network device in response to input commands supplied by the consumer.

* * * * *

UNITED STATES PATENT AND TRADEMARK OFFICE
CERTIFICATE OF CORRECTION

PATENT NO. : 7,257,581 B1
APPLICATION NO. : 09/923285
DATED : August 14, 2007
INVENTOR(S) : Steele et al.

It is certified that error appears in the above-identified patent and that said Letters Patent is hereby corrected as shown below:

Title Page
(57) ABSTRACT, line 10, change "with host" to --with the host--

Column 18
Line 60, change "oft" to --of,--

Column 20
Line 34, change "comprising" to --comprises--

Column 21
Line 21, change "computer instructions" to --computer-executable instructions--
Line 22, change "displays" to --to display--
Line 28, change "computer executable" to --computer-executable--
Line 49, change "step" to --steps--
Line 64, change "step" to --steps--

Column 22
Line 37, change "step" to --steps--
Line 50, change "step" to --steps--

Column 23
Line 10, change "retrieving" to --retrieve--
Line 14, change "passing" to --pass--
Line 17, change "autopopulating" to --autopopulate--
Line 19, change "The" to --A--
Line 50, change "transits" to --transmits--

Column 24
Line 33, change "sewer" to --server--
Line 45, change "retrieving" to --retrieve--
Lines 49-50, change "auto-populating" to --auto-populate--
Line 65, change "sewer" to --server--

Column 26
Line 47, change "claim" to --of claim--
Line 62, delete "performs the autopopulating"

UNITED STATES PATENT AND TRADEMARK OFFICE
CERTIFICATE OF CORRECTION

PATENT NO. : 7,257,581 B1
APPLICATION NO. : 09/923285
DATED : August 14, 2007
INVENTOR(S) : Steele et al.

It is certified that error appears in the above-identified patent and that said Letters Patent is hereby corrected as shown below:

<u>Column 27</u>
Line 15, change "sewer" to --server--
Line 25, change "sewer" to --server--
Line 34, change "sewer" to --server--

<u>Column 30</u>
Line 17, change "comprising" to --comprises--
Line 34, change "each" to --to each--

Signed and Sealed this

Sixth Day of October, 2009

David J. Kappos
*Director of the United States Patent and Trademark Office*